United States Patent [19]
Lokhandwala

[11] Patent Number: 6,035,641
[45] Date of Patent: *Mar. 14, 2000

[54] MEMBRANE-AUGMENTED POWER GENERATION

[75] Inventor: Kaaeid A. Lokhandwala, Union City, Calif.

[73] Assignee: Membane Technology and Research, Inc., Menlo Park, Calif.

[*] Notice: This patent is subject to a terminal disclaimer.

[21] Appl. No.: 08/934,575

[22] Filed: Sep. 19, 1997

Related U.S. Application Data

[63] Continuation-in-part of application No. 08/608,743, Feb. 29, 1996, Pat. No. 5,669,958.

[51] Int. Cl.[7] .................................................. F01K 25/06
[52] U.S. Cl. ................. 60/649; 60/651; 60/671; 95/50; 95/96; 95/143; 95/144; 95/237; 95/240
[58] Field of Search ............................. 60/649, 651, 671, 60/674; 95/39, 41, 42, 45, 50, 92, 96, 143, 149, 237, 238, 239, 240

[56] References Cited

U.S. PATENT DOCUMENTS

| | | | |
|---|---|---|---|
| 4,374,657 | 2/1983 | Schendel et al. .......................... | 62/19 |
| 4,511,382 | 4/1985 | Valencia et al. ............................ | 62/20 |
| 4,529,411 | 7/1985 | Goddin, Jr. et al. ........................ | 55/16 |
| 4,595,405 | 6/1986 | Agrawal et al. ............................ | 62/18 |
| 4,599,096 | 7/1986 | Burr .......................................... | 62/27 |
| 4,602,477 | 7/1986 | Lucadamo .................................. | 62/24 |
| 4,639,257 | 1/1987 | Duckett et al. ............................. | 55/16 |
| 4,654,063 | 3/1987 | Auvil et al. ................................. | 62/18 |
| 4,681,612 | 7/1987 | O'Brien et al. ............................. | 62/23 |
| 4,687,498 | 8/1987 | Maclean et al. ............................ | 62/17 |
| 4,689,062 | 8/1987 | Maclean et al. ............................ | 62/18 |
| 4,755,193 | 7/1988 | Higashimura et al. ..................... | 55/16 |
| 4,793,841 | 12/1988 | Burr .......................................... | 62/27 |
| 4,936,887 | 6/1990 | Waldo et al. ............................... | 62/24 |
| 5,013,338 | 5/1991 | Anand et al. ............................... | 55/158 |
| 5,040,370 | 8/1991 | Rathbone ............................. | 60/649 X |

(List continued on next page.)

OTHER PUBLICATIONS

Gottschlich et al., "Energy Minimization of Separation Processes using Conventional Membrane/Hybrid Systems," Final Report to DOE, 1990.

Tanaka et al., "Permeability and Permselectivity of Gases in Fluorinated and Non–Fluorinated Polyimides," Polymer, vol. 33, p 585, 1992.

Coleman et al., "The Transport Properties of Polymide Isomers Containing Hexafluoroisopropylidene in the Diamine Residue," J. Memb. Sci., vol. 50, p.1915, 1990.

Kim et al., Relationship Between Gas Separation Properties and Chemical Structure in a Series of Aromatic Polymides, J. Memb. Sci., vol. 37, p. 45, 1988.

Stern et al., "Structure–Permeability Relationships in Silicone Polymers," J. Polymer Sci., vol. 25, p. 1263, 1987.

Koros et al., "Sorption and Transport of Various Gases in Poly–Carbonate," J. Memb. Sci., vol. 2, p. 165, 1977.

Plate et al., Gas and Vapor Permeation and Sorption in Poly (trimethylsilylpropyne), J. Memb. Sci., vol. 60, p. 13, 1991.

Baker et al., "Nitrogen Separation from Natural Gas Using Membranes," Presented to AIChE, Houston, TX, Feb. 1993.

Toy et al., "Gas Transport Through Poly(1–Trimethylsilyl–1–Propyne) Membranes in the Presence of Organic Vapors," Presented at NAMS, Breckenridge, CO, May 1994.

Pinnau, "Membrane Material Selection for the Separation of Condensable Gases," Presented at GKSS Research Center, Sep. 1995.

Pinnau et al., "Poly(1–Trimethylsilyl–1–Propyne) —Superglassy Polymer w/Extraordinary Properties for Sep. of Organic Vapors from Permanent Gases," Presented at NAMS, Portland, OR, May 1995.

*Primary Examiner*—Hoang Nguyen
*Attorney, Agent, or Firm*—J. Farrant

[57] ABSTRACT

A method for generating electric power from natural gas or the like that has a low Btu value and a high nitrogen content. The method involves a membrane separation step to remove a portion of the nitrogen from the gas. The upgraded gas is used as fuel for a turbine or other driver, which provides mechanical power to drive an electric power generator.

23 Claims, 13 Drawing Sheets

U.S. PATENT DOCUMENTS

| | | | |
|---|---|---|---|
| 5,071,451 | 12/1991 | Wijmans | 55/16 |
| 5,089,033 | 2/1992 | Wijmans | 55/16 |
| 5,199,962 | 4/1993 | Wijmans | 55/16 |
| 5,205,843 | 4/1993 | Kaschemekat et al. | 95/16 |
| 5,281,255 | 1/1994 | Toy et al. | 96/50 |
| 5,352,272 | 10/1994 | Moll et al. | 96/9 |
| 5,374,300 | 12/1994 | Kaschemekat et al. | 95/39 |
| 5,414,190 | 5/1995 | Förg et al. | 585/802 |
| 5,806,316 | 9/1998 | Avakov et al. | 60/649 |

MEMBRANE-AUGMENTED POWER GENERATION

This application is a continuation-in-part of application Ser. No. 08/608,743 Feb. 29, 1996, now U.S. Pat. No. 5,669,958, which is incorporated herein by reference in its entirety.

FIELD OF THE INVENTION

The invention is a method that involves carrying out a membrane gas-separation step to upgrade nitrogen-laden natural gas, using the gas as fuel for a prime mover, and using the prime mover to drive an electricity generator.

BACKGROUND OF THE INVENTION

Fourteen percent of known U.S. natural gas reserves contain more than 4% nitrogen. The bulk of these reserves cannot be exploited because no economical technology for removing the nitrogen exists.

Cryogenic distillation is the only process being used to date on any scale to remove nitrogen from methane in natural or associated gas. Twelve such plants are believed to be in operation in the U.S., for example in enhanced oil recovery, where nitrogen is used to pressurize the formation and tends to build up in the associated gases removed with the oil. The gas streams that have been treated by cryogenic separation contain relatively large amounts of nitrogen, such as more than 10 vol %. Cryogenic plants can be cost effective in these applications because all the separated products have value. The propane, butane and heavier hydrocarbons can be recovered as natural gas liquids (NGL), the methane/ethane stream can be delivered to the gas pipeline and the nitrogen can be reinjected into the formation.

Cryogenic plants are not used more widely because they are expensive and complicated. A particular complication is the need for significant pretreatment to remove water vapor, carbon dioxide, and $C_{3+}$ hydrocarbons and aromatics to avoid freezing of these components in the cryogenic section of the plant, which typically operates at temperatures down to $-150°$ C. The degree of pretreatment is far more elaborate and the demands placed upon it are far more stringent than would be required to render the gas acceptable in the pipeline grid absent the excess nitrogen content. For example, pipeline specification for water vapor is generally about 120 ppm; to be fit to enter a cryogenic plant, the gas must contain no more than 1–2 ppm of water vapor at most. Similarly, 2% carbon dioxide content may pass muster in the pipeline, whereas carbon dioxide may be present only at the level of 100 ppm or less for cryogenic separation.

Other processes that have been considered for performing this separation include pressure swing adsorption and lean oil absorption; none is believed to be in regular industrial use.

Gas separation by means of membranes is known. For example, numerous patents describe membranes and processes for separating oxygen or nitrogen from air, hydrogen from various gas streams and carbon dioxide from natural gas. Such processes are in industrial use, using glassy membranes. Rubbery membranes are used to separate organic components from air or other gas mixtures, such as in resource recovery and pollution control.

It is also known to combine membrane separation with cryogenic distillation. For example, the following U.S. patents show such processes for the separation of carbon dioxide from methane: U.S. Pat. Nos. 4,529,411; 4,511,382; 4,639,257; 4,599,096; 4,793,841; 4,602,477; 4,681,612; 4,936,887 and 5,414,190. U.S. Pat. No. 4,374,657 shows a combination of cryogenic distillation and membrane separation for separating ethane from carbon dioxide. U.S. Pat. No. 4,654,063 shows cryogenic separation followed by membrane separation for separating hydrogen from other gases. U.S. Pat. No. 4,595,405 shows a similar arrangement for separation of nitrogen and oxygen from air. U.S. Pat. Nos. 4,687,498 and 4,689,062 show process designs combining membrane separation and cryogenic distillation for recovery of argon from ammonia plant purge gas mixtures.

A report by SRI to the U.S. Department of Energy ("Energy Minimization of Separation Processes using Conventional Membrane/Hybrid Systems", D. E. Gottschlich et al., Final Report under Contract number DE 91-004710, 1990) suggests that separation of nitrogen from methane might be achieved by a hybrid membrane/pressure swing adsorption system. The report shows and considers several designs, assuming that a hypothetical nitrogen-selective membrane, with a selectivity for nitrogen over methane of 5 and a transmembrane methane flux of $1 \times 10^{-6}$ $cm^3(STP)/cm^2 \cdot s \cdot cmHg$, were to become available, which to date it has not.

In fact, there are several difficulties associated with separating nitrogen from methane by means of membranes, the main one being the absence of membranes with a useful selectivity. Both glassy and rubbery membranes have poor selectivities for nitrogen over methane or methane over nitrogen. Table 1 lists some representative values.

TABLE 1

| Polymer | Permeability (Barrer) | | Selectivity (-) | | Ref. |
|---|---|---|---|---|---|
| | $N_2$ | $CH_4$ | $N_2/CH_4$ | $CH_4/N_2$ | |
| Polyimide (6FDA-mp'ODA) | 0.26 | 0.13 | 2.1 | 0.5 | 1 |
| Polyimide (6FDA-BAHF) | 3.10 | 1.34 | 2.3 | 0.4 | 1 |
| Polyimide (6FDA-IPDA) | 1.34 | 0.70 | 1.9 | 0.5 | 2 |
| Polyimide (6FDA-MDA) | 0.20 | 0.10 | 2.0 | 0.5 | 3 |
| Cellulose acetate | 0.35 | 0.43 | 0.8 | 1.2 | 4 |
| Polycarbonate | 0.37 | 0.45 | 0.8 | 1.2 | 4 |
| Polysulfone | 0.14 | 0.23 | 0.6 | 1.7 | 4 |
| Poly(dimethylsiloxane-dimethylstyrene) | 103 | 3353 | 0.3 | 3.3 | 4 |
| Poly(dimethylsiloxane) | 230 | 760 | 0.3 | 3.3 | 4 |
| Poly(siloctylene-siloxane) | 91 | 360 | 0.25 | 4.0 | 5 |
| Poly(p-silphenylene-siloxane) | 3 | 12 | 0.25 | 4.0 | 5 |
| Polyamide-polyester copolymer | 4.8 | 20 | 0.24 | 4.2 | 4 |

1 Barrer = $10^{-10}$ $cm^3(STP) \cdot cm/cm^2 \cdot s \cdot cmHg$

These separation properties are not good enough to make membrane separation practical for this gas pair. With a nitrogen-selective membrane, we have calculated that a nitrogen/methane selectivity of about 15 is needed for a practical process that achieves adequate nitrogen removal and at the same time that avoids losing excessive amounts of methane into the permeate stream.

U.S. Pat. No. 5,352,272, to Dow Chemical, concerns operation of glassy membranes at sub-ambient temperatures to improve selectivity for one gas over another. To achieve an acceptable selectivity for nitrogen over methane using known membrane materials would need an increase over the room-temperature selectivities shown in Table 1 of at least five-fold and more probably seven-fold or eight-fold. It is probable that the methane in the stream would liquefy before a low enough temperature to achieve this selectivity could be reached. Also, in glassy membranes, permeability, which is dominated by the diffusion coefficient, declines with decreasing temperature, so permeabilities, already low, would rapidly decline to an unacceptably low value.

Membrane separations are usually driven by a pressure difference between the feed and permeate sides, the feed side being at high pressure with respect to the permeate side. With a methane-selective membrane, if the bulk of the gas stream being treated has to pass to the permeate low-pressure side, then be recompressed, it is to be expected that this would make for an inefficient and hence costly process. Likewise, the membrane area that is needed to perform the separation is in proportion to the amount of gas that must cross the membrane; if most of the gas in the feed has to permeate the membrane, a much larger membrane area will be needed than if only a few percent of the feed gas has to permeate.

Thus, the separation of nitrogen from methane by means of membranes is a very difficult problem and has not, to applicants' knowledge, been previously attempted, either as a stand-alone operation or in conjunction with other separation techniques.

SUMMARY OF THE INVENTION

As disclosed in U.S. Pat. No. 5,669,958, the invention is a membrane separation process for treating a gas stream containing methane and nitrogen, the gas stream typically, but not necessarily, being natural gas. In that case, the invention involved passing the gas stream to be treated across the feed side of a methane-selective membrane at a temperature at which the membrane exhibits a target selectivity for methane over nitrogen, and withdrawing a nitrogen-enriched, methane-depleted residue stream and a methane-enriched, nitrogen-depleted permeate stream.

The present invention concerns a method for generating electric power from natural gas or the like that has a high nitrogen content and a low Btu value, such as below about 950 Btu/scf. The invention involves the use of a similar membrane separation to that of the parent application, carried out as a step in an electric power generation method. In a basic embodiment, the present invention comprises:
(a) performing a membrane separation step, comprising:
(i) providing a membrane having a feed side and a permeate side and being selective for methane over nitrogen;
(ii) passing a gas stream comprising methane and nitrogen across the feed side of the membrane;
(iii) withdrawing from the feed side a residue stream depleted in methane and enriched in nitrogen compared with the gas stream;
(iv) withdrawing from the permeate side a permeate stream enriched in methane and depleted in nitrogen compared with the gas stream;
(b) using at least a portion of the permeate stream as combustion fuel in a driver;
(c) using the driver to drive an electric power generator.

To achieve useful separation results, the membranes should preferably exhibit a methane/nitrogen selectivity of at least about 4, more preferably about 5 or more. We have found that such a target selectivity can be achieved for rubbery materials by cooling, preferably down to no more than about −50° C. Furthermore, this selectivity is accompanied by high methane transmembrane flux, such as at a very minimum at least about $1\times10^{-6}$ cm$^3$(STP)/cm$^2$·s·cmHg, preferably at least $1\times10^{-5}$ cm$^3$(STP)/cm$^2$·s·cmHg and more preferably at least $1\times10^{-4}$ cm$^3$(STP)/cm$^2$·s·cmHg.

The method of the invention can be carried out with several types of membranes. The first is rubbery membranes. The second is membranes made from the so-called "super-glassy" polymers, defined and described in the Detailed Description of the Invention below, that exhibit anomalous behavior for glassy materials in that they preferentially permeate larger, more condensable molecules over smaller, less condensable molecules. A third alternative is inorganic membranes, such as microporous carbon or ceramic membranes.

Preferably, at least a portion of the cooling required to produce adequate selectivity is obtained by expanding the reject nitrogen stream and using this to chill the incoming feed stream. The methane/nitrogen separation process may be carried out in one or multiple membrane stages. Less preferably, the membrane separation may be augmented by other nitrogen/methane separation techniques.

The methane-enriched permeate stream is used to provide all or part of the combustion fuel for a prime mover or a driver. The driver is typically a turbine, but may also be an internal combustion engine or the like. The excess shaft or belt power provided by the driver is used to power an electric generator.

In another aspect, the invention is an apparatus for electric power generation. The invention is advantageous in that it provides a simple method to extract value from gas streams with high nitrogen content that might otherwise be very difficult to make use of.

Gas streams to be treated by and used in the process of the invention may, and frequently do, include other components, such as $C_{3+}$ hydrocarbons. Optionally, these components may be removed from the gas stream by condensation to provide an additional valuable product, such as natural gas liquid (NGL).

DETAILED DESCRIPTION OF THE INVENTION

As used herein, gas means gas or vapor.

As used herein, $C_{3+}$ hydrocarbon means a straight-chain or branched chain saturated or unsaturated hydrocarbon having three or more carbon atoms.

The invention claimed in parent application Ser. No. 08/608,743 is a membrane separation process for treating a gas stream containing methane and nitrogen, the gas stream typically, but not necessarily, being natural gas. In that case, the invention involved passing the gas stream to be treated across the feed side of a methane-selective membrane at a temperature at which the membrane exhibits a target selectivity for methane over nitrogen, and withdrawing a nitrogen-enriched, methane-depleted residue stream and a methane-enriched, nitrogen-depleted permeate stream.

The present invention involves the use of a similar membrane separation carried out as a step in an electric power generation method. In its most basic embodiment, the invention has three elements: carrying out a membrane gas-separation step to upgrade nitrogen-laden natural gas; using the gas as fuel for a prime mover that delivers mechanical power; and using the prime mover to drive an electricity generator, thereby converting mechanical power to electrical power.

Figure 3:
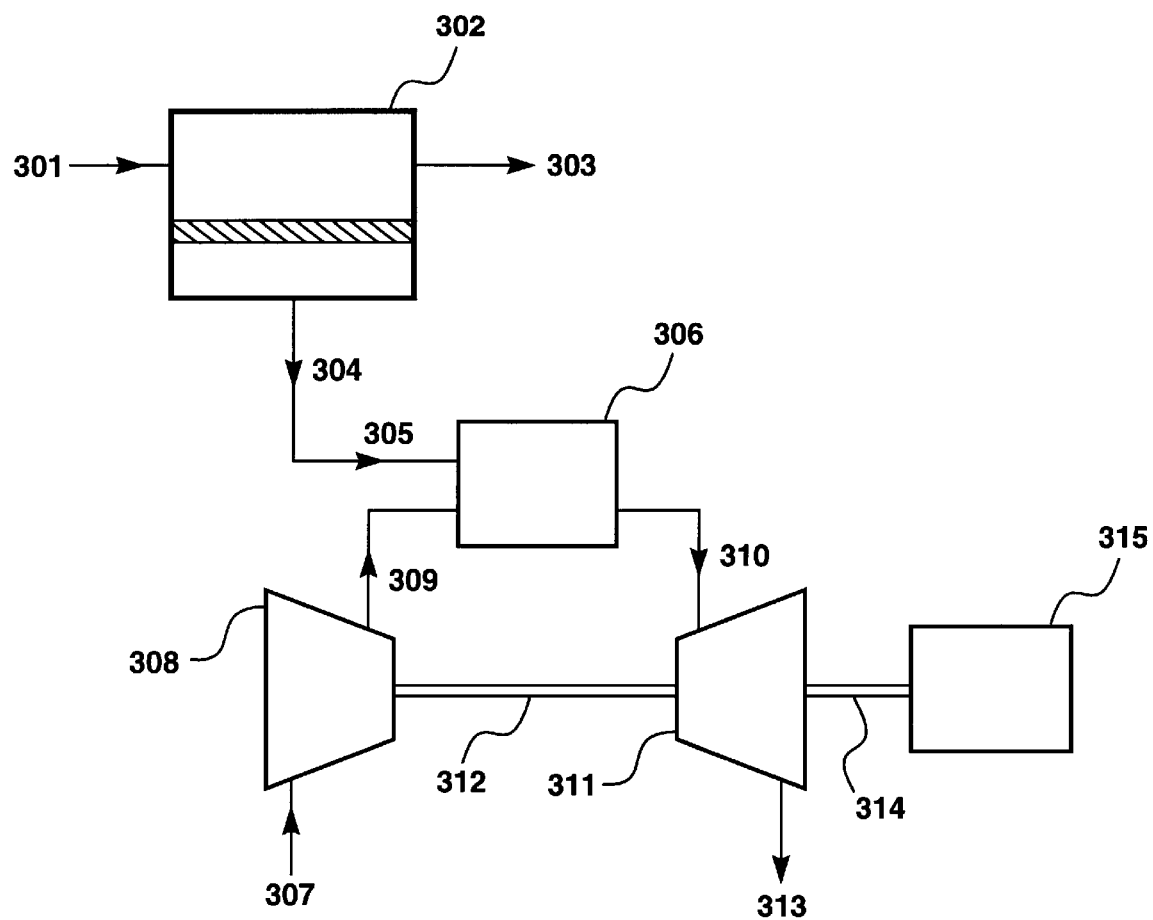
FIG. 3 is a schematic drawing illustrating the invention in a simple representative embodiment.

A simple embodiment of the invention, using a turbine to drive an inlet compressor and a generator, is shown schematically in FIG. 3, referring to which feed stream 301, containing at least methane and nitrogen, passes to membrane separation step or unit 302. Here the stream is divided into residue stream 303, enriched in nitrogen and depleted in methane compared with stream 301, and permeate stream 304, enriched in methane and depleted in nitrogen compared with stream 301. Stream 304 passes into the fuel inlet line 305 to combustor 306. Air stream 307 passes through compressor 308 and passes as compressed air stream 309 to the combustor. Hot gas 310 from the combustor is used to drive turbine 311 and exits as exhaust stream 313. Shaft power developed by the turbine is deployed through shaft 312 to drive compressor 308 and through shaft 314 to drive electricity generator 315.

The invention is particularly useful in generation of electric power on-site at, or close to, a gas field. Advances in gas turbine technology, such as in combined cycle processes, are beginning to make such electric power generation attractive. Under some conditions, the economics of using the gas directly to make electricity are more favorable than piping the gas itself to distant locations. Not only is electric power useful to a wider base of industries than natural gas, but the costs of electricity transmission across long distances are usually significantly lower than the corresponding gas transport costs.

A feature of modern turbines is that they can deliver electricity at high efficiency, while utilizing relatively lean fuel gas mixtures. The fuel gas does not have to be of pipeline quality composition, such as in regard to water content, hydrocarbon dewpoint and so on. The membrane separation step can be used to provide some upgrading of the Btu value of nitrogen-laden gas, thereby rendering it suitable for turbine fuel. A particular advantage of using our membrane-based process to remove nitrogen from the raw gas is that, in many embodiments, essentially all of the raw gas from the well can be used, or at least value can be extracted from multiple fractions. As just one example, suppose the raw gas contains a relatively high content of both nitrogen and $C_{3+}$ hydrocarbons. A condensation step can be used in front of the membrane separation step to recover natural gas liquids (NGL). The membrane step can then be used to treat the remaining gas to create a low-pressure permeate stream, enriched in methane and remaining heavier hydrocarbons and depleted in nitrogen, and thus having an upgraded Btu value compared with the membrane feed gas. This gas can still contain as much as 8%, 10%, or in some cases considerably more, nitrogen and still be acceptable as fuel gas for the turbine. As a result, the demands on the separation capabilities of the membrane system are less than in the case when the target is pipeline-grade gas. This means that raw gas with a nitrogen content that would be unacceptably high for a pipeline-grade product can be usefully exploited. Furthermore, the feed gas to the combustor for the power-generating turbine does not have to be at high pressure, so recompression of the membrane permeate stream is not always required.

The gas separation step is carried out as generally in accordance with the teachings of parent application Ser. No. 08/608,743, that is, by passing the nitrogen-laden gas mixture across the feed side of a methane-selective membrane. A driving force for transmembrane permeation is provided by a superatmospheric pressure on the feed side, a subatmospheric pressure on the permeate side, or both. A residue stream depleted in methane and enriched in nitrogen compared with the feed is withdrawn from the feed side of the membrane. A permeate stream enriched in methane and depleted in nitrogen is withdrawn from the permeate side.

One particular advantage is the ability of the membranes to operate in the presence of water and hydrocarbons. Water is always present in raw natural gas streams to some extent, as vapor, entrained liquid, or both. The presence of this water has little or no adverse effects on the types of membranes used in the invention, but will simply permeate the membrane along with the methane. Likewise, propane, butane and higher hydrocarbons will pass into the permeate stream. Even if the membrane separation is performed at close to the dew point for these components, any condensation of liquid will not damage the membrane. In fact, as discussed in more detail in co-owned U.S. Pat. No. 5,688,307, entitled "Separation of Low-Boiling-Point Gases using Super-Glassy Membranes", incorporated herein by reference in its entirety, when super-glassy membranes are used, the presence of material in the feed stream that can condense within the membrane enhances the methane/nitrogen separation capability.

Most membranes that have been used in the past in the gas industry, such as cellulose acetate membranes for removing carbon dioxide from methane, are not suitable for the methane/nitrogen separation step of the invention. Neither are any other conventional glassy polymer membranes, which exhibit slight selectivity in favor of nitrogen over methane.

Without wishing to be bound by theory, we believe the methane/nitrogen separation step can best be understood starting from a brief theoretical explanation of permeation in polymer materials. A synthetic polymer membrane separates the components of a gas or vapor mixture because the components permeate the membrane at different rates. The permeability, $P[cm^3(STP)\cdot cm/cm^3\cdot s\cdot cmHg]$, of a polymer membrane material for a gas is defined as the rate at which that gas moves through a standard thickness [1 cm] of the material under a standard driving force [a pressure difference of 1 cmHg]. A measure of the ability of a membrane to separate two gases is the selectivity, $\alpha$, defined as the ratio of the gas permeabilities, $P_1/P_2$. Selectivity can also be expressed as:

$$\alpha = \frac{D_1}{D_2} \cdot \frac{k_1}{k_2}$$

where D is the diffusion coefficient of the gas in the membrane $[cm^2/s]$, which is a measure of the gas mobility, and k is the Henry's law sorption coefficient, which links the concentration of the gas in the membrane material to the pressure in the adjacent gas $[cm^3(STP)/cm^3\cdot cmHg]$. The intrinsic selectivity of a polymer material is established by measuring the permeabilities with pure gas or vapor samples, then calculating the ratio. The actual selectivity obtained in a real separation process is established by making permeation measurements with gas mixtures.

The ratio $D_1/D_2$ is the ratio of the diffusion coefficients of the two gases and can be viewed as the mobility selectivity, reflecting the different sizes of the two molecules. The ratio $k_1/k_2$ is the ratio of the Henry's law solubility coefficients of the two gases and can be viewed as the solubility selectivity, reflecting the relative condensabilities of the two gases.

In all polymer materials, the diffusion coefficient decreases with increasing molecular size. Hence, the mobility component of the selectivity always favors the passage of small molecules over large ones. The solubility component of the selectivity, on the other hand, is a measure of the energy required for sorption and normally increases with molecular diameter, because larger molecules are normally more condensable than smaller ones. The combined effect of these two factors determines the selectivity of the membrane.

The balance between mobility selectivity and solubility selectivity is different for glassy and rubbery polymers. In glassy polymers, the diffusion term is usually dominant, permeability falls with increasing permeant size and the material is selective for small molecules over large ones. In rubbery polymers, the solubility term is usually dominant, permeability increases with increasing permeant size and the material is selective for large molecules over smaller ones. The molecular kinetic diameters of nitrogen (3.64 Å) and methane (3.8 Å) are similar, and methane has a critical temperature of $-82.6°$ C., so is only moderately more soluble than nitrogen in most polymer materials. The slightly smaller molecular size of nitrogen means that glassy materials slightly favor the passage of nitrogen over methane. The relative condensability of methane means that rubbery materials slightly favor the passage of methane over nitrogen. As a result of the similar molecular sizes and the poor condensability of both components, however, both glassy and rubbery membrane materials have poor selectivity for this gas pair, as was illustrated in Table 1.

However, we have found that, with cooling, an acceptable methane/nitrogen selectivity, for example, about 4, 5 or more is obtainable with gas mixtures in certain rubbery polymer membranes. In addition, we have found that such selectivities can be accompanied by usefully high transmembrane methane fluxes, such as at a very minimum at least about $1\times 10^{-6}$ $cm^3(STP)/cm^2\cdot s\cdot cmHg$, preferably at least $1\times 10^{-5}$ $cm^3(STP)/cm^2\cdot s\cdot cmHg$ and more preferably at least $1\times 10^{-4}$ $cm^3(STP)/cm^2\cdot s\cdot cmHg$.

As can be seen from the brief explanation of the solution/diffusion transport mechanism above, it is important that the material to be used remains rubbery under the temperature conditions at which it is used, so that the separation remains dominated by the sorption or solubility term. As the temperature is reduced from 20° C., rubbery membranes at first become more methane selective with falling temperature. The transmembrane fluxes of both gases fall, but the loss in methane flux is small compared with the loss in nitrogen flux, so that the selectivity increases. As the temperature is decreased further, the membrane material begins to lose flexibility and the balance of the sorption and diffusion components of the selectivity shifts in favor of the diffusion term, so that the material now becomes less methane-selective, rather than more, as the temperature falls. In some materials the properties may alter to such an extent that the material becomes nitrogen-selective, even considerably above the nominal glass-transition temperature. Thus, the operating temperature of the invention should preferably be at least 30° C. above the glass-transition temperature of the rubbery membrane material, more preferably at least 40° C. above and most preferably at least 50° C. or more above. Also, the lower the temperature that is used, the greater is the cost and difficulty of reaching that temperature.

On the other hand, since it is the difference between the sorption of methane and nitrogen that provides the selectivity, it is desirable to take advantage of a low operating temperature to enhance this difference.

Considering the need to balance these factors, our preferred appropriate operating temperature for the methane/nitrogen separation membranes is below 0° C., or, expressed as a temperature range, between 0° C. and $-100°$ C., more preferably between about $-10°$ C. and $-80°$ C. and most preferably between about $-20°$ C. and $-70°$ C. Specifically we prefer to operate, where possible, at temperatures no lower than about $-40°$ C., $-50°$ C., $-60°$ C. or $-70°$ C. The choice of operating temperature is influenced to some extent, of course, by the particular transport properties of the membrane material used.

The preferred rubbers for making membranes for use in the invention are those that have a glass transition temperature ($T_g$) at 1 atmosphere pressure of below $-50°$ C., more preferably below $-80°$ C. and most preferably below $-100°$ C.

Specific, but non-limiting, preferred rubbery materials that we have found to be within the scope of this definition include siloxane polymers, particularly the polymers having a repeating unit having the structure:

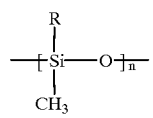

wherein R is an alkyl group having one to eight carbon atoms. These have glass transition temperatures approximately as follows:
Poly(dimethylsiloxane) $-123°$ C.
Poly(methylethylsiloxane) $-135°$ C.
Poly(methylpropylsiloxane) $-120°$ C.
Poly(methylhexylsiloxane) $-108°$ C.
Poly(methyloctylsiloxane) $-92°$ C.
Amongst these, particularly preferred are poly(dimethylsiloxane), that is, silicone rubber, and poly(methyloctylsiloxane). Poly(methylphenylsiloxane) may also be used. Other rubbers that we expect to be useful include those listed in Table 1, specifically poly (dimethylsiloxane-dimethylstyrene) poly(siloctylenesiloxane) and poly(p-silphenylene-siloxane). Yet other rubbers include polymethylene, poly (dimethylsilylenemethylene), cis-poly(1-butylene), poly (dimethoxyphosphazene), poly(octadecylmethacrylate) and poly(oxytetramethylenedithiotetramethylene), all of which have glass transition temperatures in the range −70° C. to 110° C. Yet other rubbers that may be useful include methylene-ethylene copolymers having glass transition temperatures around −100° C., polyisoprene, polybutadiene and natural rubber.

Usually, rubbery materials do not have enough mechanical strength to be formed as unsupported membranes. Therefore, preferred embodiments incorporating rubbery selective materials involve the use of a composite membrane comprising a microporous support, onto which the rubbery selective layer is deposited as a thin coating. The preparation of such membranes is well known in the membrane-making art. It is commonly thought that rubbery composite membranes do not withstand high-pressure operation well, and to date, such membranes have not been generally used in natural gas treatment, where feed gas pressures are often as high as 500 psig or 1,000 psig. We have found, however, that composite membranes, with thin enough rubbery selective layers to provide adequate transmembrane methane flux, can be used satisfactorily at high feed pressures and not only maintain their integrity but continue to exhibit adequate selectivity for methane over nitrogen.

A second type of membrane that we have found to be useful for the methane/nitrogen separation step is formed from the so-called "super-glassy" polymers. These materials are characterized by having a rigid structure, high glass transition temperatures, typically above 100° C., 200° C. or higher, and unusually high free volume within the polymer material, such as more than 10%, more than 20% or even as high as 25% or more (as estimated from vapor solubility data according to the method of W. J. Koros et al., J. Membrane Science, Vol. 2, page 165, 1977). In contrast, conventional glassy polymers typically have free volumes within the polymer itself of a few percent, such as 3% for polycarbonate, or 6% for polyphenylene oxide. Super-glassy materials useful for carrying out the invention exhibit unusual behavior for glassy materials in that they preferentially permeate larger, more condensable molecules over smaller, less condensable molecules, so that they are selective, albeit slightly at room temperature, for methane over nitrogen. Super-glassy materials useful for carrying out the invention are further characterized in that they have a high methane permeability at room temperature, by which we mean a permeability of at least about 1,000 Barrer.

Without wishing to be bound by theory, we believe that certain of the high-free-volume, glassy polymers are useful in our invention because their permeation properties are not governed by solution/diffusion (the mechanism of gas transport in conventional, low-free-volume polymers), but are more akin to transport in microporous polymers.

If numerical values for free volume, glass transition temperature and/or methane permeability are not to hand, therefore, a simple, first-pass screening technique to identify likely high-free-volume glassy polymers for carrying out our invention is to examine the oxygen/nitrogen permeability data. Such data are much more readily available for many materials than methane permeability data, and will enable potential candidate materials to be rapidly identified. We believe materials with the required structure to meet the demands of our invention will normally have oxygen permeabilities at room temperature of at least about 500 Barrer (where 1 Barrer=1×10$^{-10}$ cm$^3$(STP)·cm/cm$^2$·s·cmHg), and oxygen/nitrogen selectivity at room temperature of no more than about 2.5.

The best known of the super-glassy materials, representative of the class and useful in our invention, is polytrimethylsilylpropyne (PTMSP), which has a free volume of about 25% according to the above-mentioned method. Although PTMSP is rigid and glassy, up to at least about 200° C., it exhibits an oxygen permeability of 10,000 Barrer or above, more than 15 times higher than that of silicone rubber, previously the most permeable polymer known. The selectivity for oxygen/nitrogen, however, is low (1.5–1.8). The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide. These pure-gas data suggest that PTMSP will exhibit poor selectivity for most gas separations. See for example, a paper by N. A. Platé et al. entitled "Gas and vapor permeation and sorption in poly(trimethylsilylpropyne)", Journal of Membrane Science, Vol. 60, pages 13–24, 1991.

We also found that permeation tests performed with pure gas samples of methane and nitrogen yielded low calculated ideal selectivities. We found, however, that the measured mixed-gas selectivity is slightly better, at about 2.5–3. Furthermore, we found that chilling the feed gas stream produced a substantial increase in selectivity, while maintaining good permeability. For example, chilling to −30° C. raised the mixed gas methane/nitrogen selectivity to about 5.5. This selectivity was obtained with a simulated natural gas stream containing 82% methane, 9% ethane, 3% propane, 1% butane and 5% nitrogen.

Non-limiting examples of the types of polymer materials useful for carrying out the gas-separation step include members of the following structure groups that also meet the above glass-transition temperature, free volume and permeation limits:

(i) Substituted acetylenes, having the general structural formula

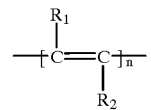

where $R_1$ and $R_2$ are independently hydrogen, a halogen, $C_6H_5$ or a linear or branched $C_1$–$C_4$ alkyl group.

(ii) Silicon-containing polyacetylenes, having the general structural formula

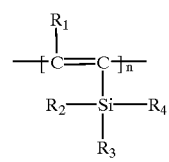

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group.

(iii) Germanium-containing polyacetylenes, having the general structural formula

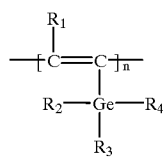

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group.
(iv) Copolymers of any of the above with each other or with other polymer materials.

A particularly useful polymer material falling within the general definitions above is poly(trimethylsilylpropyne) (PTMSP), which has the structure:

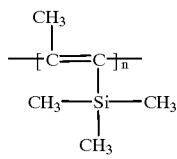

Membranes useful in the methane/nitrogen separation step may be formed from these glassy, high-free-volume materials in a variety of ways. Because the materials are glassy and rigid, an unsupported film of the polymer may be usable as a single-layer gas separation membrane. Alternatively, the membrane may be an integral asymmetric membrane, comprising a dense region that forms the separation membrane and a microporous support region. As a further alternative, the membrane may be a composite membrane comprising the separation membrane and an attached or unattached backing layer, or a composite membrane comprising a microporous support membrane of one polymer coated with the separation membrane of another polymer. We prefer to use composite membranes.

A third type of membrane that may be used is finely microporous inorganic membranes, such as adsorbent carbon membranes of the type described in U.S. Pat. No. 5,332,424, pyrolysed carbon membranes of the type described in U.S. Pat. No. 4,685,940, or certain ceramic membranes. These types of membranes can exhibit acceptable methane/nitrogen selectivity in the presence of a $C_{3+}$ hydrocarbon or other relatively condensable component in the gas mix.

Whether rubbery polymers or other membrane materials are used, membranes useful in the invention may be formed as flat sheets, hollow fibers or any other convenient form, and housed in any appropriate type of module, such as plate-and-frame, potted fiber or spiral-wound. Spiral-wound modules are a preferred choice.

Figure 1:
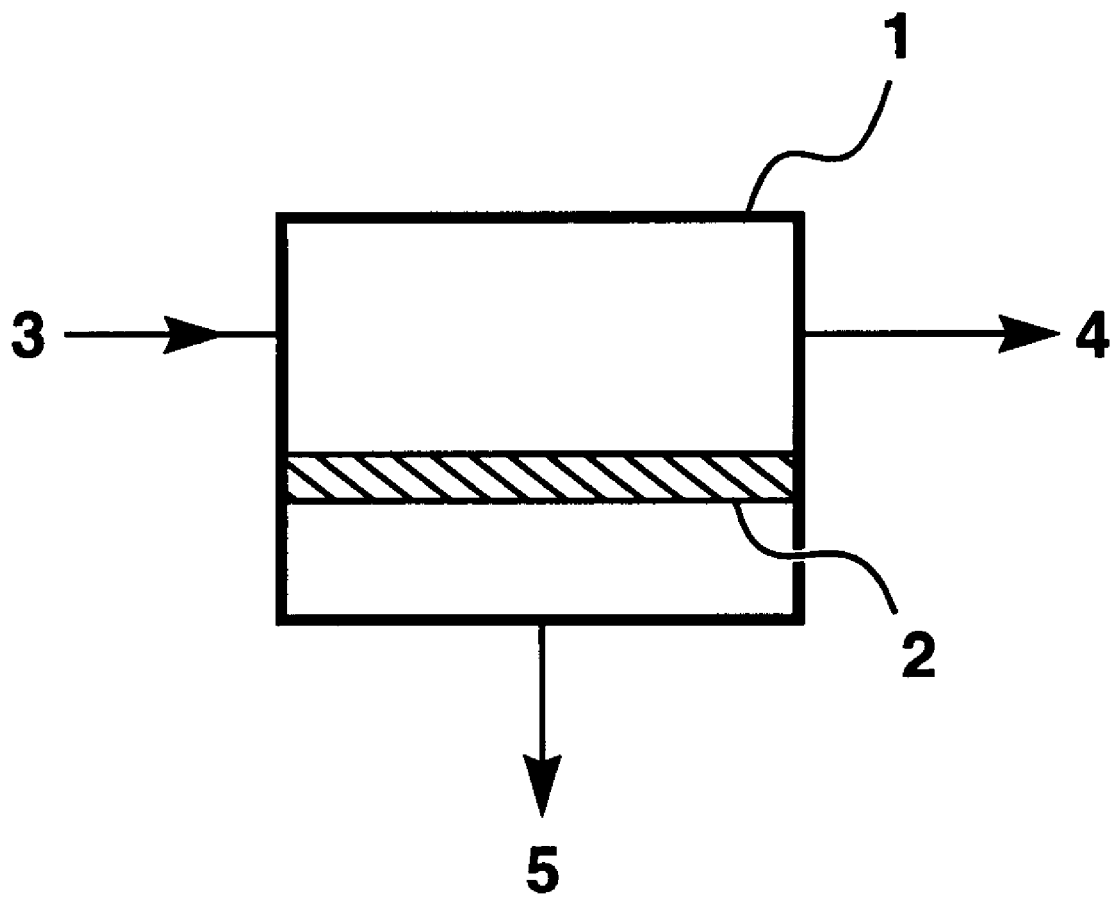
FIG. 1 is a schematic drawing illustrating the membrane gas-separation step in its most basic form.

The basic methane/nitrogen separation step is represented in simple form in the schematic drawing of FIG. 1. Referring now to this figure, membrane unit 1 contains a membrane 2 that exhibits selectivity for methane over nitrogen. Feed stream 3, containing at least methane and nitrogen, passes across the feed side of the membrane. Residue stream 4, enriched in nitrogen and depleted in methane compared with stream 3, is withdrawn from the feed side. Permeate stream 5, enriched in methane and depleted in nitrogen compared with stream 3, is withdrawn from the permeate side. Transmembrane permeation occurs because permeate stream 5 is at a lower pressure than feed stream 3. The pressure difference between the feed and permeate sides of the membrane may occur because the raw feed gas is already at elevated pressure, such as 300 psia, 500 psia or 1,000 psia. Alternatively, the pressure difference can be created by compressing the feed stream before it enters the membrane unit, by drawing a partial vacuum on the permeate side, or by combinations of these, such as is widely understood and practiced in the gas separation art.

FIG. 1 shows a basic arrangement in which a single bank of membrane modules is used. It will be appreciated by those of skill in the art that many arrangements of membrane modules are possible within the scope of the invention. For example, two-stage or multi-stage configurations, in which the permeate from one module or bank of modules is fed to the next stage, can be used if further processing of the first-stage permeate is required. Two-step or multi-step configurations, in which the residue from one module or bank of modules is fed to the next step, can be used if further processing of the first-step residue is required. Multi-stage and multi-step arrangements can also be combined.

Figure 2:
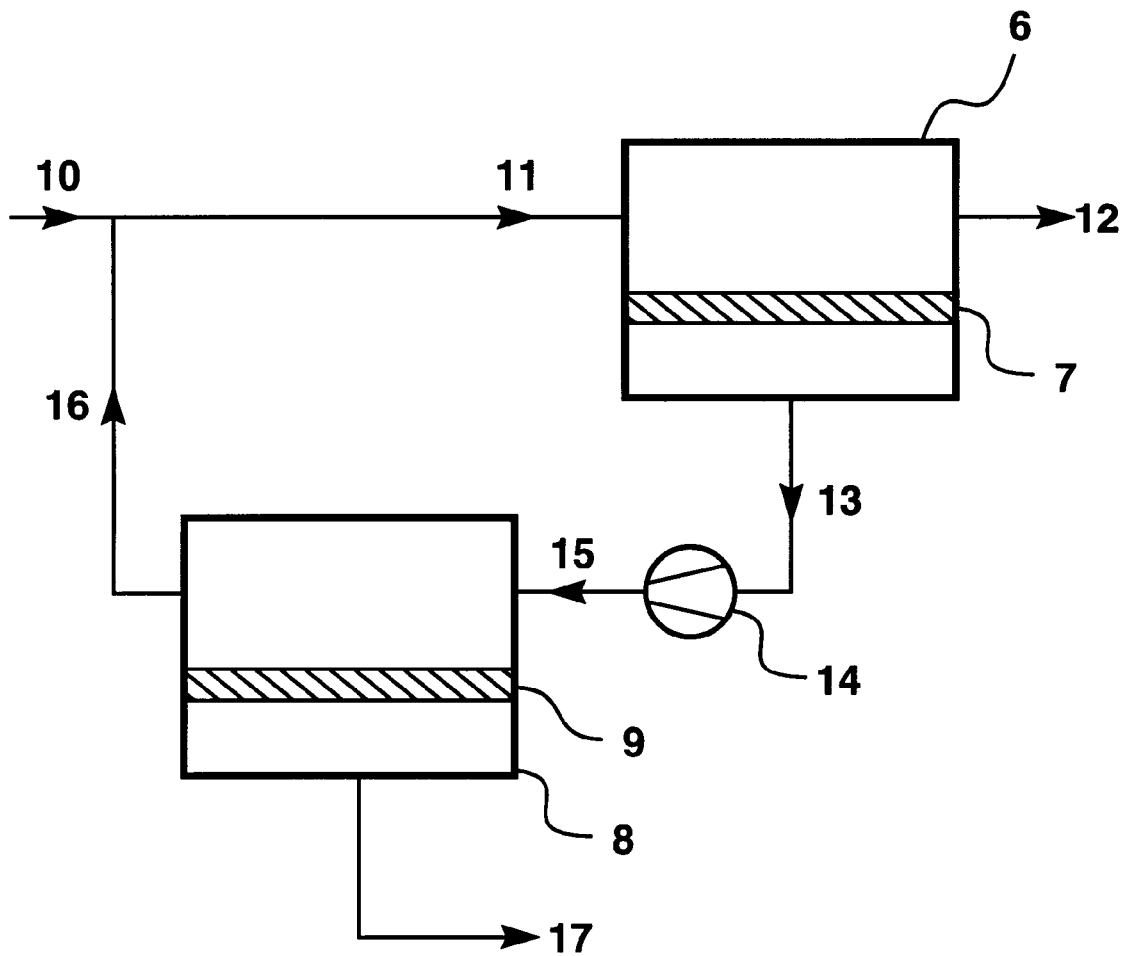
FIG. 2 is a schematic drawing illustrating the membrane gas-separation step as carried out using a two-stage membrane unit.

As just one example, for feed streams with a high nitrogen content, a two-stage membrane system as shown in FIG. 2 can be used. Referring now to FIG. 2, membrane units 6 and 8 contain membranes 7 and 9 that exhibit methane/nitrogen selectivity. Gas stream 10, containing at least methane and nitrogen, is mixed with recycle stream 16 to form feed stream 11, which passes across the feed side of membrane 7. Residue stream 12, enriched in nitrogen and depleted in methane compared with stream 11, is withdrawn from the feed side. First permeate stream 13, enriched in methane and depleted in nitrogen compared with stream 11, is withdrawn from the permeate side of membrane 7. Transmembrane permeation occurs because permeate stream 13 is at a lower pressure than feed stream 11. Stream 13 is compressed in compressor 14 to form feed stream 15 to the second membrane unit 8. Stream 15 passes across the feed side of membrane 9. Residue stream 16, enriched in nitrogen and depleted in methane compared with stream 15, is withdrawn from the feed side of membrane 9 and is recycled to join stream 10. Second permeate stream 17, further enriched in methane and depleted in nitrogen compared with stream 15, is withdrawn as the methane product stream from the permeate side of membrane 9.

Occasionally, the gas stream to be treated may already be at a temperature at which the desired selectivity is manifest, but in most cases the stream will need to be chilled. The cooling required to produce adequate selectivity can be obtained by any convenient method known to the art. Typically, but not necessarily, cooling will involve heat exchange by running the feed gas stream to the membrane unit in indirect contact against a colder fluid.

It is preferred if heat integration can be practiced, such as by using at least a portion of the residue or permeate streams, or both, to cool or partially cool the incoming feed. The nitrogen-enriched residue stream is often at a high pressure compared with atmospheric, such as 500 psig or 1,000 psig. In this case, it may be acceptable, and is attractive from the energy efficiency and cost points of view, to exploit the available high pressure by expanding this stream to a lower pressure, such as in a turbo-expander, before using it as a heat-exchange medium for the feed stream. This provides additional cooling, and the turbo-expander may optionally also be used to at least partially recompress the permeate gas, and/or to power an additional generator.

Figure 4:
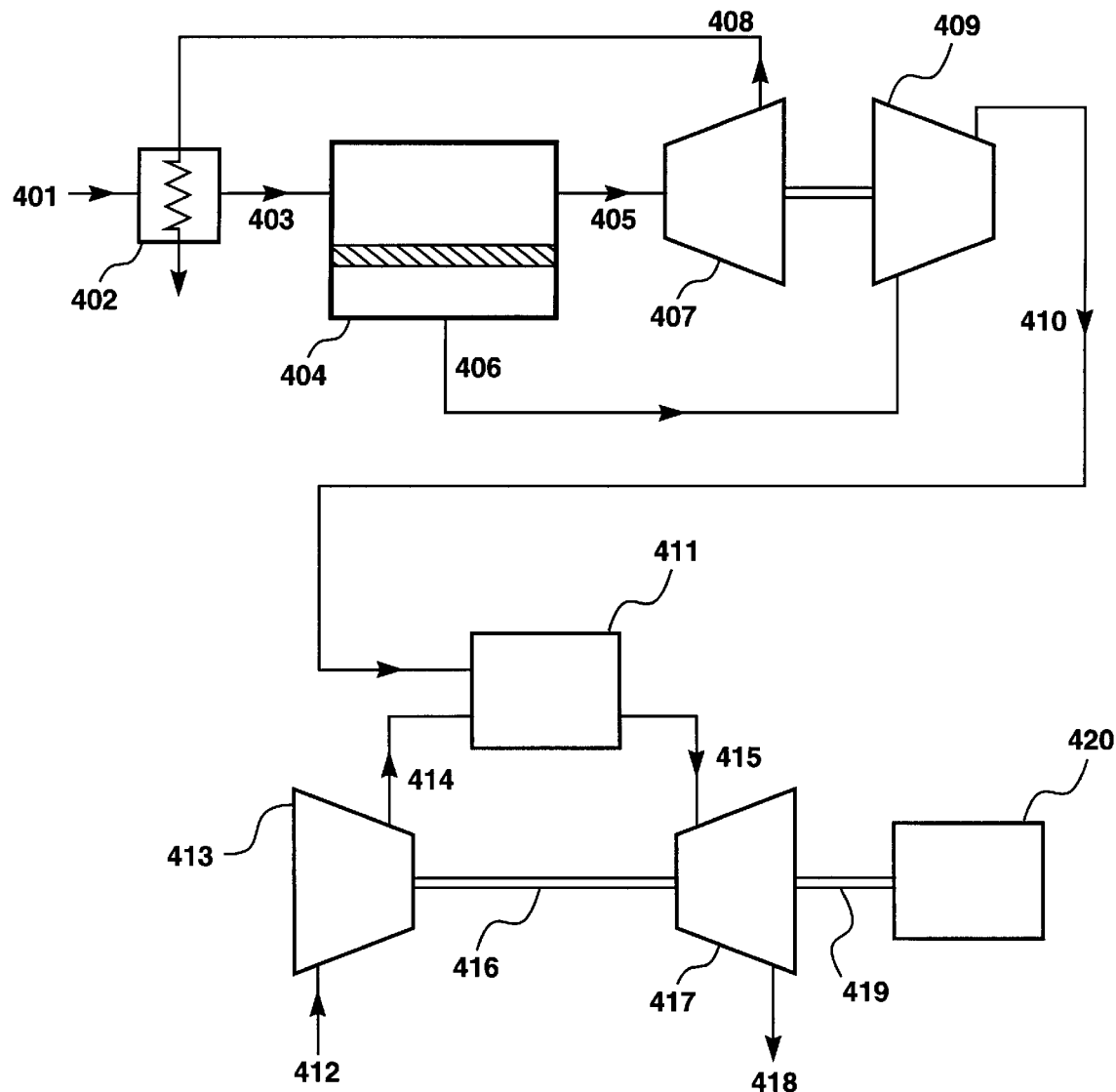
FIG. 4 is a schematic drawing illustrating a preferred embodiment of the invention in which a turbo-expander is used to cool the membrane residue stream and compress the membrane permeate stream.

One representative embodiment of such a scheme is shown in FIG. 4. Referring now to this figure, feed stream 401 passes through heat exchanger 402, emerging as cooled stream 403, which is passed to membrane separation step or unit 404. Here the stream is divided into residue stream 405, enriched in nitrogen and depleted in methane compared with stream 401, and permeate stream 406, enriched in methane and depleted in nitrogen compared with stream 401. Stream 405 is directed to turbo-expander 407, which is connected to compressor 409. Stream 405 expands and cools as it passes through the turbo-expander and is passed as stream 408 through the coolant channels of heat exchanger 402. Stream 406 passes into compressor 409, which is powered by turbo-expander 407. The compressed permeate exits into fuel inlet line 410 to combustor 411. Air stream 412 passes through compressor 413 and passes as compressed air stream 414 to the combustor. Hot gas 415 from the combustor is used to drive turbine 417 and exits as exhaust stream 418. Shaft power developed by the turbine is deployed through shaft 416 to drive compressor 412 and through shaft 419 to drive electricity generator 420.

It is possible, although less preferable, to augment the methane/nitrogen membrane separation step by any other separation techniques, such as absorption or adsorption, as discussed in U.S. Pat. No. 5,669,958.

The second step in the method of the invention is to use the treated gas as fuel for a prime mover or driver that delivers mechanical power. The fuel gas may be passed directly from the membrane unit to the combustor of the driver, as indicated in FIG. 3, or may be subjected to temperature, pressure or further composition adjustment as required. For example, the fuel inlet pressure may be raised as shown in FIG. 4, by passing the permeate stream through a compressor driven by a turbo-expander in the membrane residue line, or otherwise.

Figure 5:
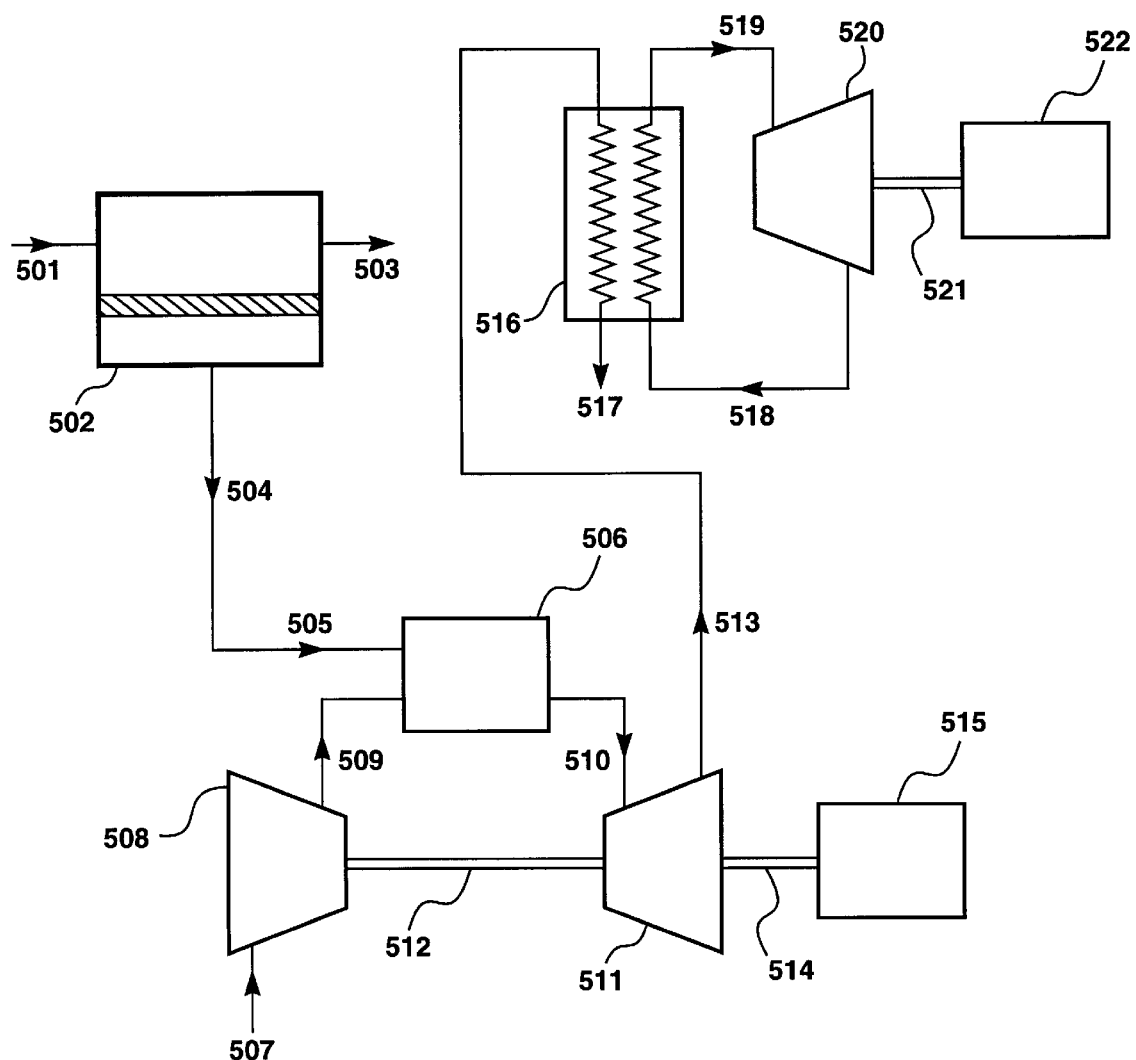
FIG. 5 is a schematic drawing illustrating an embodiment of the invention in which additional power is generated by a steam turbine.

The driver may be of any convenient form that may be powered by a fuel of the grade provided by the treated gas, such as a turbine or an internal combustion engine. Preferred drivers are gas turbines. Types of turbine that can be used include, but are not limited to, single-shaft and split-shaft turbines, single-stage and multi-stage turbines, and turbines employing simple open cycle, regenerated Brayton cycle, combined cycle and other configurations. The design and operation of such turbines is well known in the art. It is most preferred to use a combined cycle arrangement, in which the hot exhaust gas from the primary turbine is used to generate steam, which can then be used to generate additional power by expansion through a steam turbine. This tends to provide higher overall thermal efficiency than other turbine configurations. Such an embodiment is shown in FIG. 5. Referring to this figure, feed stream 501 passes to membrane separation step or unit 502. Here the stream is divided into residue stream 503, enriched in nitrogen and depleted in methane compared with stream 501, and permeate stream 504, enriched in methane and depleted in nitrogen compared with stream 501. Stream 504 passes into the fuel inlet line 505 to combustor 506. Air stream 507 passes through compressor 508 and passes as compressed air stream 509 to the combustor. Hot gas 510 from the combustor is used to drive primary turbine 511 and exits as exhaust stream 513. Shaft power developed by the turbine is deployed through shaft 512 to drive compressor 508 and through shaft 514 to drive electricity generator 515.

The hot exhaust gas stream 513 from the primary turbine enters steam generator 516, which will typically contain economizer, evaporator and superheater heat exchange zones. The cooled exhaust gas exits the process or apparatus as stream 517. Steam produced in the steam generator enters steam turbine 520 as stream 519. The steam turbine may also be of any convenient design and type, such as single-stage or multi-stage, Rateau or Curtis design, condensing or non-condensing, extraction or admission, and impulse or reaction. FIG. 5 shows a closed Rankine cycle, in which the exhaust steam exits as stream 518 and is condensed and pumped back to the steam generator by a condenser and pump (not shown for simplicity). Shaft power developed by the steam turbine is deployed through shaft 521 to drive an additional electricity generator 522.

The third step in the process is electric power generation. The generator may be of any type, but is typically a three-phase synchronous generator, as is well known in the art. The power generated may be used on-site, or may be fed to a power grid. Typical on-site power generation and cogeneration facilities can produce between 1 and 500 MW of power, with most installations in the 10–100 MW range. At an energy conversion efficiency of 50%, the natural gas volumes required to produce this amount of power are between 2 and 20 MMscfd, at which scale the use of cryogenic methane/nitrogen separation is prohibitively expensive.

Electric power produced by the process of the invention can be used for a diversity of power needs at remote sites. Representative uses include, but are not limited to, running of manufacturing or processing facilities for agricultural crops, for example sugar mills, or other raw materials. As yet another example, cogeneration is used to provide a very economical source of power and heat for some cities. The power is sold to the grid and the waste heat from the generators is used for building heating.

The gas streams to which the invention is applied may be subjected to any known treatments upstream or downstream of the membrane process, to any or all of the feed, residue and permeate streams, as discussed in U.S. Pat. No. 5,669,958. A particularly preferred embodiment of the method includes a condensation step upstream of the membrane separation step to recover an NGL product. This enables additional value to be extracted from the stream.

Figure 12:
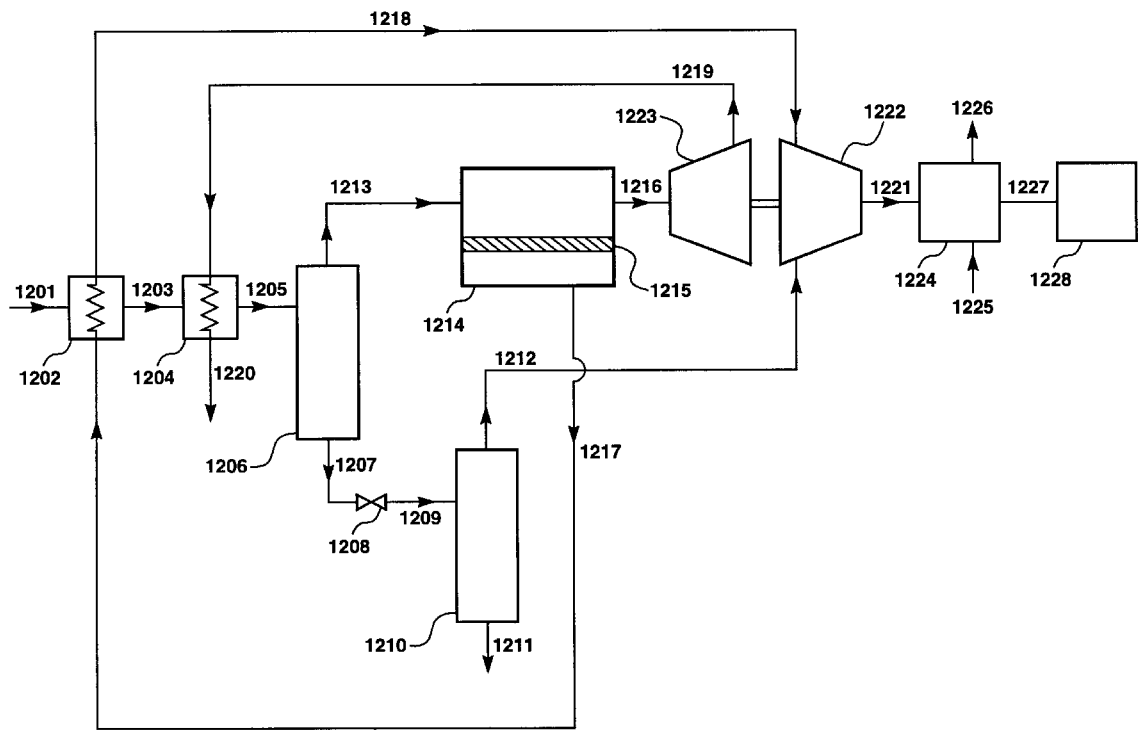
FIG. 12 is a schematic drawing illustrating an embodiment of the invention that includes an NGL recovery step.

General schemes for combinations of membrane separation and condensation that might be used to recover the heavier hydrocarbons as a liquid product are shown, for example, in U.S. Pat. Nos. 5,089,033; 5,199,962; 5,205,843; and 5,374,300, and a specific embodiment of the invention including NGL recovery is shown in FIG. 12 and described in more detail in Example 7 below.

The invention is now further illustrated by the following examples, which are intended to be illustrative of the best mode of carrying out the invention, but are not intended to limit the scope or underlying principles of the invention in any way.

EXAMPLES

Example 1

Preparation of Silicone Rubber Membrane

A microporous support membrane was dip-coated in a 6% dimethyl siloxane solution at 1 ft/min coating speed, then dried in an oven at 60° C. to crosslink the membrane. The resulting membranes had a nominal selective layer thickness of 20 $\mu$m. Samples of the finished composite membrane were cut into 12.6 cm$^2$ stamps and tested in a permeation test-cell apparatus with pure oxygen and pure nitrogen at 23° C. feed temperature and 50 psig feed pressure. The gas fluxes of the membranes were measured, and the oxygen/nitrogen selectivities were calculated. Any membrane with a selectivity less than the intrinsic selectivity of the material was considered defective.

Example 2

Preparation of Pebax 2533 Membrane

Membranes were prepared as in Example 1, using a 5% Pebax 2533 polymer solution. The resulting membranes had a nominal selective layer thickness of 6 μm. Fluxes and selectivities of the finished membranes were calculated to test for integrity as in Example 1.

Example 3

Preparation of PTMSP Membrane

Films of PTMSP were prepared by hand-casting. A 2-wt % polymer solution in toluene was cast onto clean glass plates with a casting bar. After evaporation of the solvent, the films were removed from the glass plate by immersion in water and were dried in a vacuum oven at 80° C. The nominal thickness of the films was about 30 μm. Fluxes and selectivities of the finished films were calculated to test for integrity as in Example 1.

Example 4

Effect of Feed Temperature on Silicone Rubber Membrane

Figure 6:
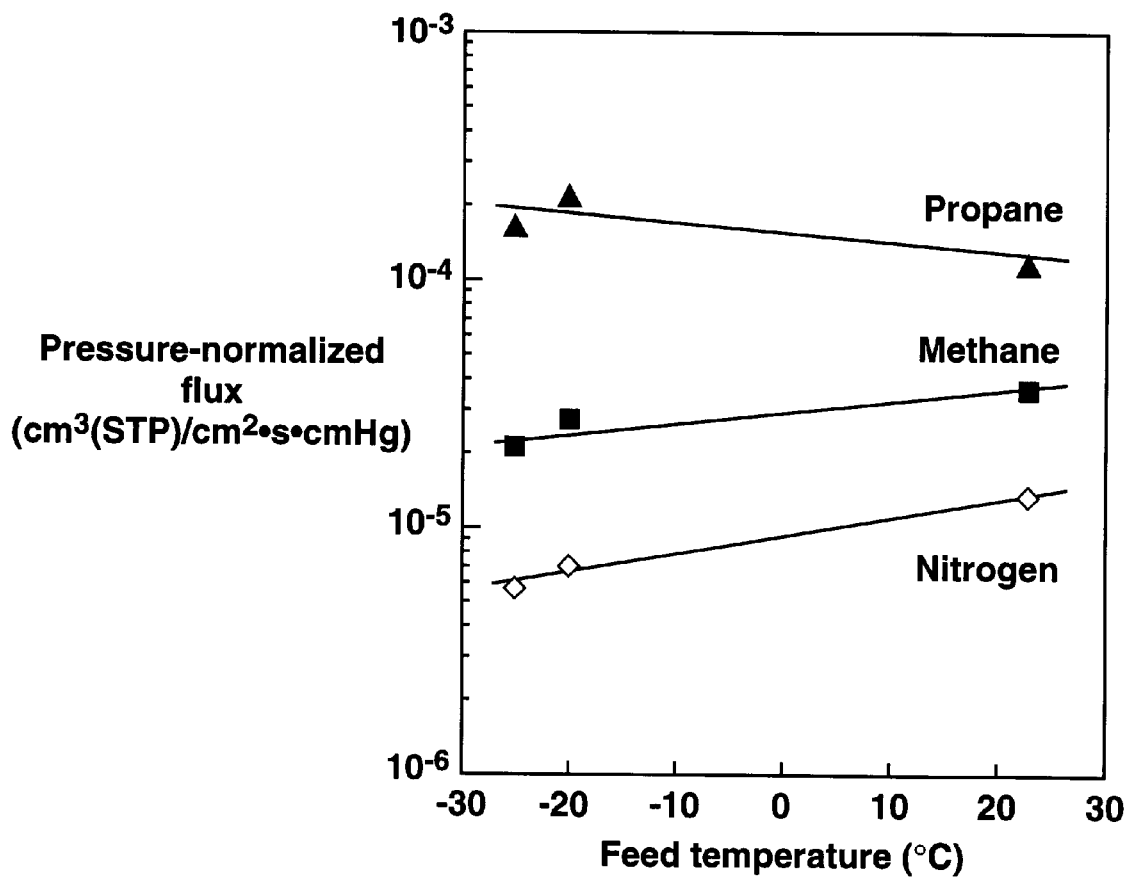
FIG. 6 is a graph of pressure-normalized transmembrane flux as a function of feed temperature for permeation of propane, methane and nitrogen through a silicone rubber membrane.
Figure 7:
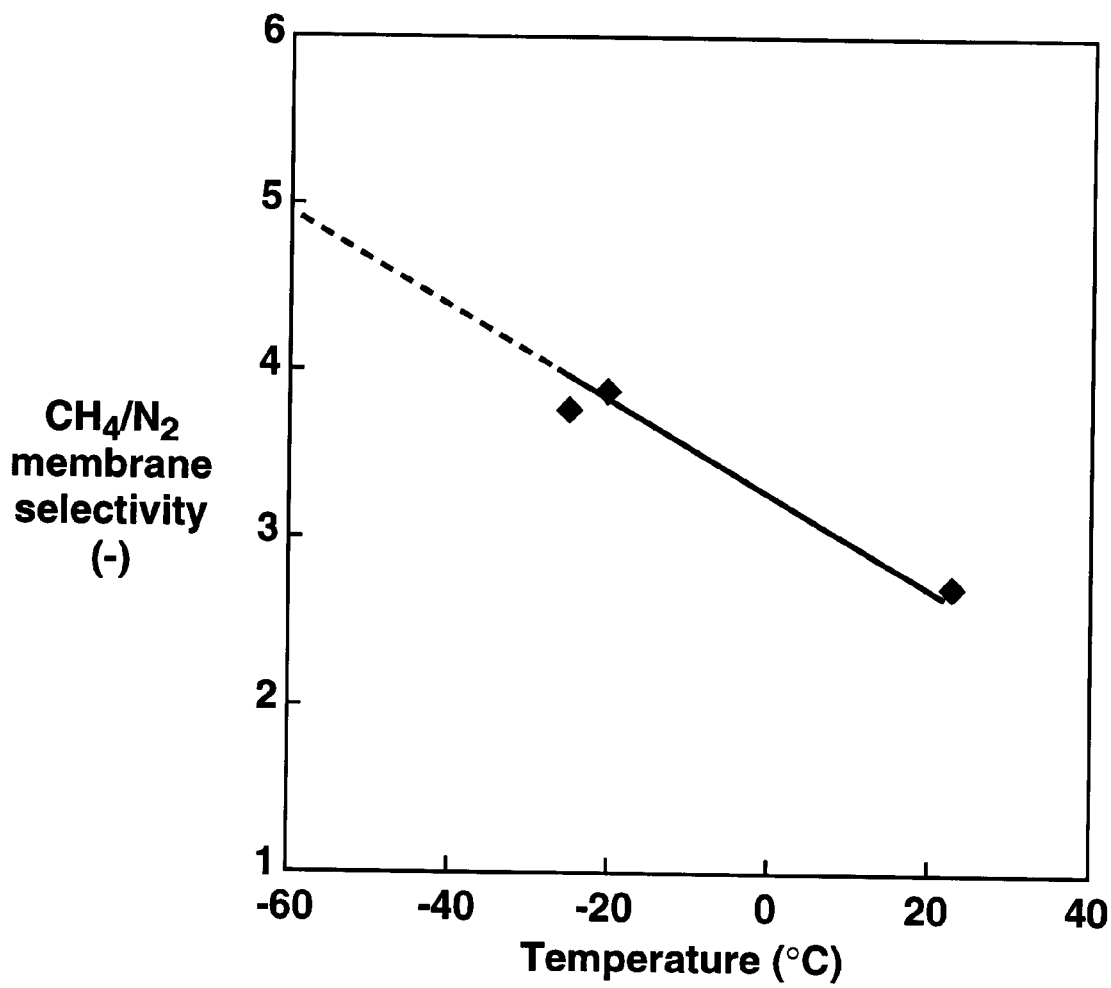
FIG. 7 is a graph of methane/nitrogen membrane selectivity as a function of feed temperature for a silicone rubber membrane.

An experiment was carried out to determine the performance of a silicone rubber membrane at different temperatures. Membranes were prepared as in Example 1. The silicone rubber composite membrane was cut into 12.6-cm² stamps, and subjected to permeation tests following the general procedure as described in Example 1, using a model natural gas mixture containing 87% methane, 10% nitrogen, and 3% propane at three feed temperatures, −26° C., −10° C., and 23° C. The low temperatures were obtained by immersing the test cell in a low-temperature recirculating chiller. Measurements were made at a feed pressure of 200 psia. The permeate side was maintained at atmospheric pressure. During each test, the feed, permeate, and residue compositions were analyzed by gas chromatography (GC). The pressure-normalized fluxes of propane, methane, and nitrogen, and the propane/nitrogen, propane/methane, and methane/nitrogen selectivities were calculated using an in-house computer program. Flux and selectivity results are shown in FIGS. 6 and 7.

The pressure-normalized fluxes of nitrogen and methane both decrease with decreasing temperature, because of a decrease in diffusion coefficient that exceeds the gain in solubility coefficient. For propane, a condensable gas, the increase in solubility is larger than the decrease in diffusion coefficient, resulting in a net increase in the pressure-normalized flux at lower temperatures.

The methane/nitrogen selectivity increased with decreasing temperature, from about 2.7 at 23° C., to about 4 at sub-ambient temperatures. As can be seen from FIG. 7, a selectivity of about 5 can be obtained at an operating temperature of about −60° C. This temperature is sufficiently above the glass-transition temperature of silicone rubber (−123° C.) that the selectivity is still increasing as temperature falls.

Example 5

Effect of Temperature on Pebax Membrane

Figure 8:
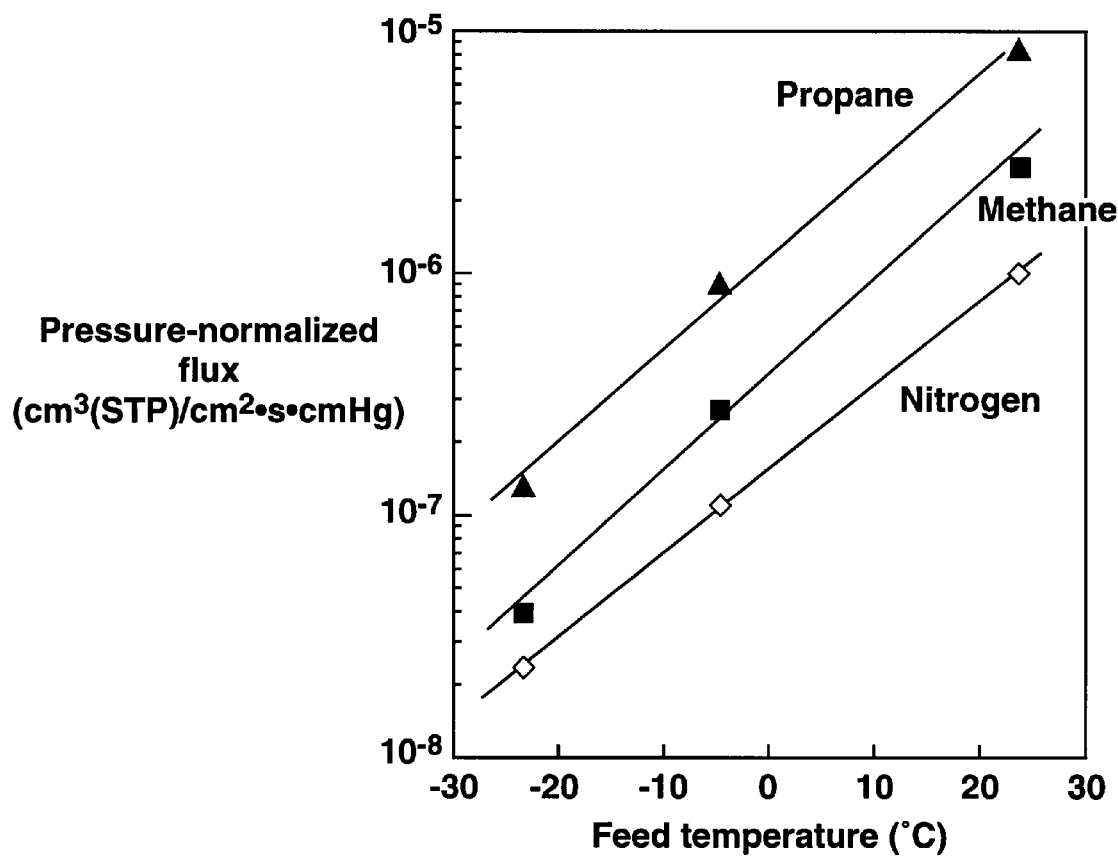
FIG. 8 is a graph of pressure-normalized transmembrane flux as a function of feed temperature for permeation of propane, methane and nitrogen through a Pebax 2533 membrane.
Figure 9:
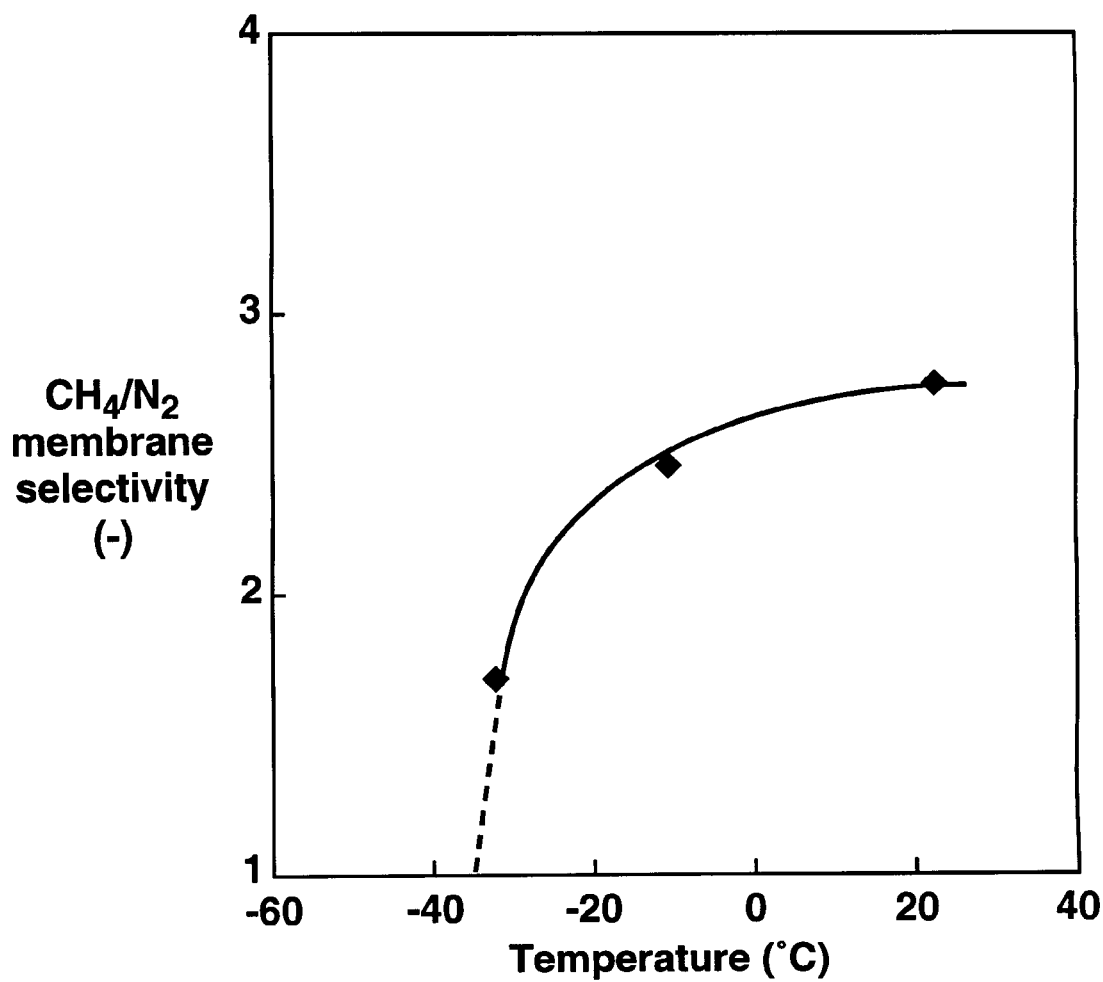
FIG. 9 is a graph of methane/nitrogen membrane selectivity as a function of feed temperature for a Pebax 2533 membrane.

An experiment was carried out to determine the performance of a Pebax membrane at different temperatures. Pebax is a polyamide-polyether block copolymer that is rubbery at room temperature and that was believed to have a glass-transition temperature below −50° C. From earlier experiments, it was known that this material has a methane/nitrogen selectivity in the range 2–4 at room temperatures. Pebax membranes were prepared as in Example 2, and were subjected to mixed-gas permeation tests as in Example 4. The pressure-normalized fluxes of propane, methane, and nitrogen, and the propane/nitrogen, propane/methane, and methane/nitrogen selectivities, were calculated using an in-house computer program. Flux and selectivity results are shown in FIGS. 8 and 9.

Surprisingly, the pressure-normalized fluxes of all three components decrease with decreasing temperature, and the loss of methane permeability was more severe than the loss of nitrogen permeability. As a result, the methane/nitrogen selectivity decreased from close to 3 at room temperature to only about 1.8, and falling, at −30° C. This decrease must be due to the membrane becoming more glassy in character as the temperature falls. It appears that the glass-transition temperature of this polymer is probably around −40° C. or −50° C., and that even 30° C. or 40° C. above the transition, the "glassy", diffusion-controlled effects are beginning to dominate the solubility effects. This polymer is, therefore, not suitable for use in methane/nitrogen separation as described here and is outside the scope of the invention.

Example 6

Effect of Feed Temperature on PTMSP Films

Figure 10:
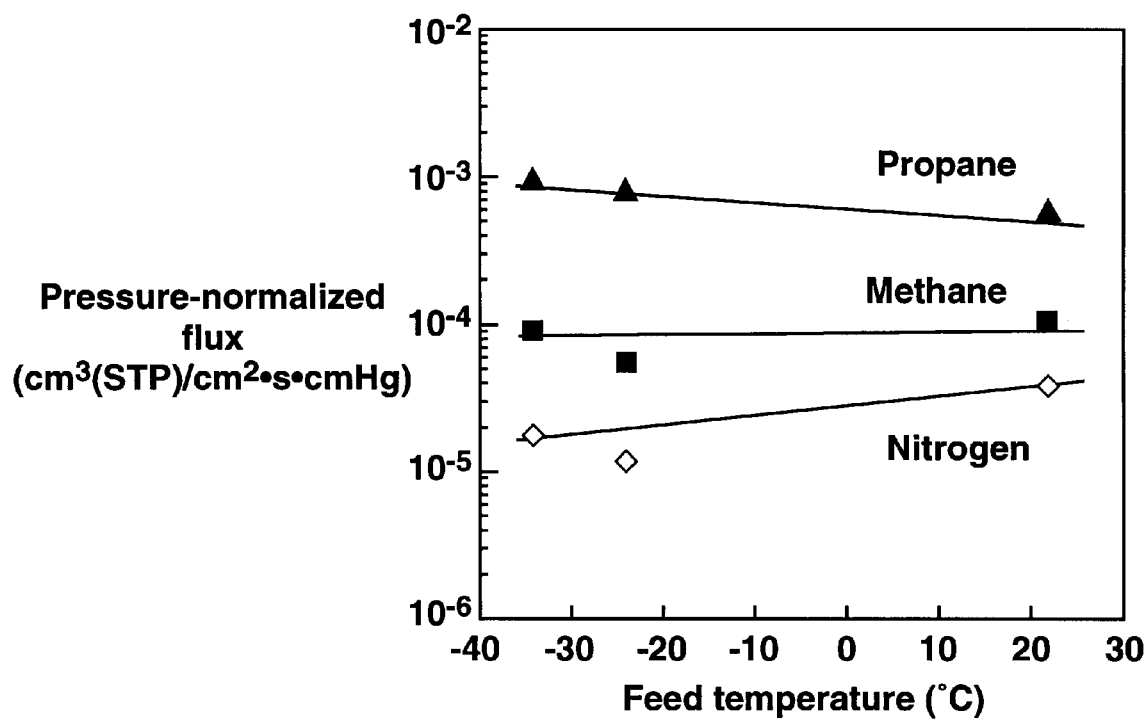
FIG. 10 is a graph of pressure-normalized transmembrane flux as a function of feed temperature for permeation of propane, methane and nitrogen through a PTMSP membrane.
Figure 11:
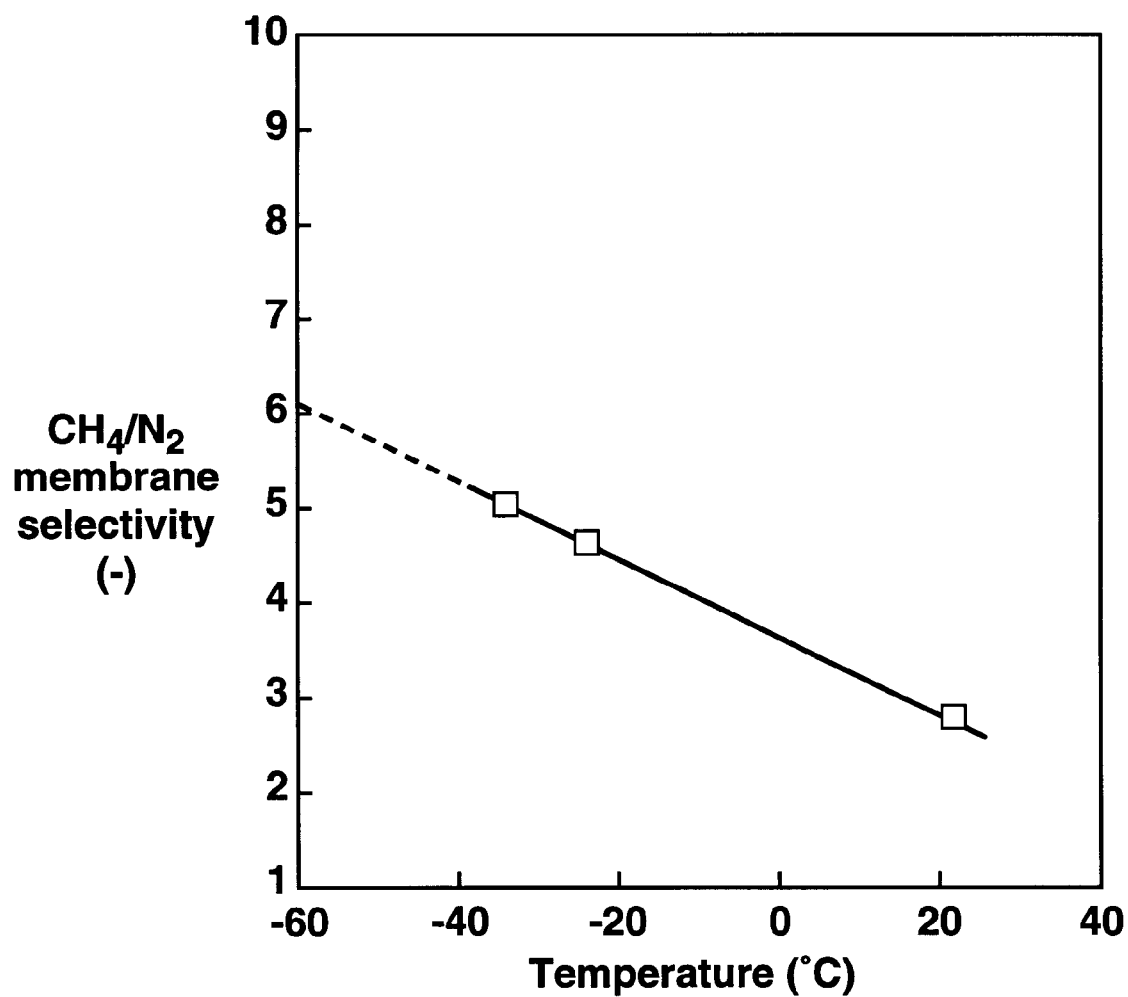
FIG. 11 is a graph of methane/nitrogen membrane selectivity as a function of feed temperature for a PTMSP membrane.

An experiment was carried out to determine the performance of a PTMSP film at different temperatures. PTMSP films were prepared as in Example 3, and were subjected to mixed-gas permeation tests as in Example 4. These films were tested at temperatures of 23° C., −26° C. and −34° C. The pressure-normalized fluxes of propane, methane, and nitrogen, and the propane/nitrogen, propane/methane, and methane/nitrogen selectivities were calculated using an in-house computer program. Flux and selectivity results are shown in FIGS. 10 and 11.

The pressure-normalized flux of propane increases as the temperature falls. Propane is condensable and sorbs strongly into the free-volume of PTMSP, especially at lower temperatures. The methane flux remains fairly constant at about $1 \times 10^{-4}$ cm³(STP)/cm²·s·cmHg over the temperature range. The nitrogen flux falls from about $4 \times 10^{-5}$ cm³(STP)/cm²·s·cmHg to about $1.8 \times 10^{-5}$ cm³(STP)/cm²·s·cmHg, resulting in a rise in selectivity from 2.8 at 23° C. to about 5 at −34° C. As can be seen from FIG. 11, lower temperatures would result in higher selectivities of 6 or more.

Example 7

A computer calculation of the gas-treatment steps was performed with a modeling program, ChemCad III (ChemStations, Inc., Houston, Tex.), to simulate the method of the invention in the typical representative embodiment shown in FIG. 12. This embodiment involves:

- a condensation step to recover an NGL fraction containing $C_{3+}$ hydrocarbons
- a one-stage membrane separation step
- use of a turbo-expander to cool and extract power from the membrane residue stream
- partial recompression of the membrane permeate stream
- use of the permeate stream as turbine fuel, and
- electric power generation using shaft power from the turbine.

Referring to FIG. 12, the raw feed gas in stream 1201 is run countercurrent to the permeate stream, 1217, in heat exchanger 1202. Cooled stream 1203 is further chilled by the expanded residue stream, 1219, in heat exchanger 1204. Chilled stream, 1205, passes to separator, 1206, from which Butane $600 \times 10^{-6}$ cm$^3$(STP)/cm$^2$·sec·cmHg Pentane $800 \times 10^{-6}$ cm$^3$(STP)/cm$^2$·sec·cmHg The results of the calculations are shown in Table 2.

TABLE 2

| Stream | 1201 | 1205 | 1207 | 1209 | 1211 | 1213 | 1219 | 1220 | 1217 | 1218 | 1212 | 1221 |
|---|---|---|---|---|---|---|---|---|---|---|---|---|
| Flow (lbmol/h) | 580 | 580 | 46.9 | 46.9 | 12.2 | 533 | 112 | 112 | 422 | 422 | 34.7 | 456.3 |
| Mass flow (lb/h) | 13,700 | 13,700 | 1,800 | 1,800 | 700 | 11,900 | 2,900 | 2,900 | 9,000 | 9,000 | 1,100 | 10,100 |
| Temp. (° C.) | 35 | −18 | −18 | −45 | 10 | −18 | −174 | −9 | −51 | 30 | 10 | 43 |
| Pressure (psia) | 1,000 | 1,000 | 1,000 | 100 | 100 | 1,000 | 18 | 18 | 100 | 100 | 100 | 120 |
| Component (mol %): | | | | | | | | | | | | |
| Nitrogen | 30.0 | 30.0 | 5.6 | 5.6 | 0.1 | 32.1 | 81.7 | 81.7 | 19.0 | 19.0 | 7.6 | 18.1 |
| Methane | 53.0 | 53.0 | 27.2 | 27.2 | 1.7 | 55.3 | 17.8 | 17.8 | 65.2 | 65.2 | 36.2 | 63.0 |
| Ethane | 10.0 | 10.0 | 21.0 | 21.0 | 7.3 | 9.0 | 0.4 | 0.4 | 11.3 | 11.3 | 25.9 | 12.4 |
| Propane | 4.0 | 4.0 | 19.2 | 19.2 | 20.2 | 2.7 | 0.01 | 0.01 | 3.4 | 3.4 | 18.9 | 4.5 |
| Butanes | 2.0 | 2.0 | 16.4 | 16.4 | 37.0 | 0.7 | — | — | 0.9 | 0.9 | 9.1 | 1.6 |
| Pentanes | 1.0 | 1.0 | 10.5 | 10.5 | 33.7 | 0.2 | — | — | 0.2 | 0.2 | 2.3 | 0.4 |

— less than 0.01
Membrane area = 390 m$^2$ condensed liquid bottoms stream, 1207, enriched in C$_{3+}$ hydrocarbons, is withdrawn. The pressure of stream 1207 is let down from 1,000 psia to 100 psia through expansion valve 1208 and expanded stream 1209 is passed into flash tank, 1219. NGL product is withdrawn as liquid bottoms stream, 1211. The light gases flashed from this tank as overhead stream 1212 are fed into compressor 1222 and form part of the fuel gas product.

The overhead stream, 1213, from separator 1206 is fed to the membrane unit, 1214, containing a membrane, 1215, that is selective for methane and other hydrocarbons over nitrogen. The feed stream is separated into nitrogen-enriched, methane-depleted residue stream, 1216, and methane-enriched, nitrogen-depleted permeate stream, 1217. Stream 1216 is fed to turbo-expander 1223, where it is expanded and emerges as cold, depressurized stream 1219. This stream passes through heat exchanger 1204 to provide cooling for the feed stream and is discharged from the process as stream 1220.

Permeate stream 1217 passes through heat exchanger 1202 to provide first-stage cooling for feed stream 1201, and then passes as stream 1218 to the inlet side of compressor 1222, which is powered by expander 1223. The resulting compressed gas leaves the compressor in line 1221 and is fed to the combustor of turbine 1224. Air enters the turbine through inlet 1225 and exhaust gas leaves the turbine as stream 1226. Mechanical power generated by the turbine is transmitted by shaft 1227 to generator 1228.

The raw gas stream was assumed to be a 5 MMscfd mixture of 30 mol % nitrogen, 53 mol % methane, 10 mol % ethane, 4 mol % propane, 2 mol % butane and 1 mol % pentane at a pressure of 1,000 psia and a temperature of 35° C. Such gas has a heating value of about 890 Btu/scf.

Membrane pressure-normalized fluxes were assumed to be as follows, as are typical of a silicone rubber membrane:

Nitrogen $20 \times 10^{-6}$ cm$^3$(STP)/cm$^2$·sec·cmHg

Methane $100 \times 10^{-6}$ cm$^3$(STP)/cm$^2$·sec·cmHg

Ethane $200 \times 10^{-6}$ cm$^3$(STP)/cm$^2$·sec·cmHg

Propane $400 \times 10^{-6}$ cm$^3$(STP)/cm$^2$·sec·cmHg

As can be seen, the gas treatment steps yield an NGL product containing over 90% C$_{3+}$ hydrocarbons at a rate of about 700 lb/h and a combustion fuel having a reduced nitrogen content of about 18 mol % at a rate of about 450 lbmol/h and a pressure of 120 psia. The Btu value of the upgraded fuel gas is about 1,000 Btu/scf. Waste stream 1220 contains over 80 mol % nitrogen and is produced at a flow rate of less than 1 MMscfd. Thus the process is able to capture and extract value from over 95% of the hydrocarbon content of the feed.

Example 8

A computer calculation was performed to illustrate the process of the invention in an embodiment in which the membrane residue and permeate streams are used to cool the incoming feed stream to enhance the membrane separation performance, but without expansion of the residue stream. In this case, the hydrocarbons that condense as a result of this cooling are allowed to vaporize and fed to the fuel line with the permeate stream.

Figure 13:
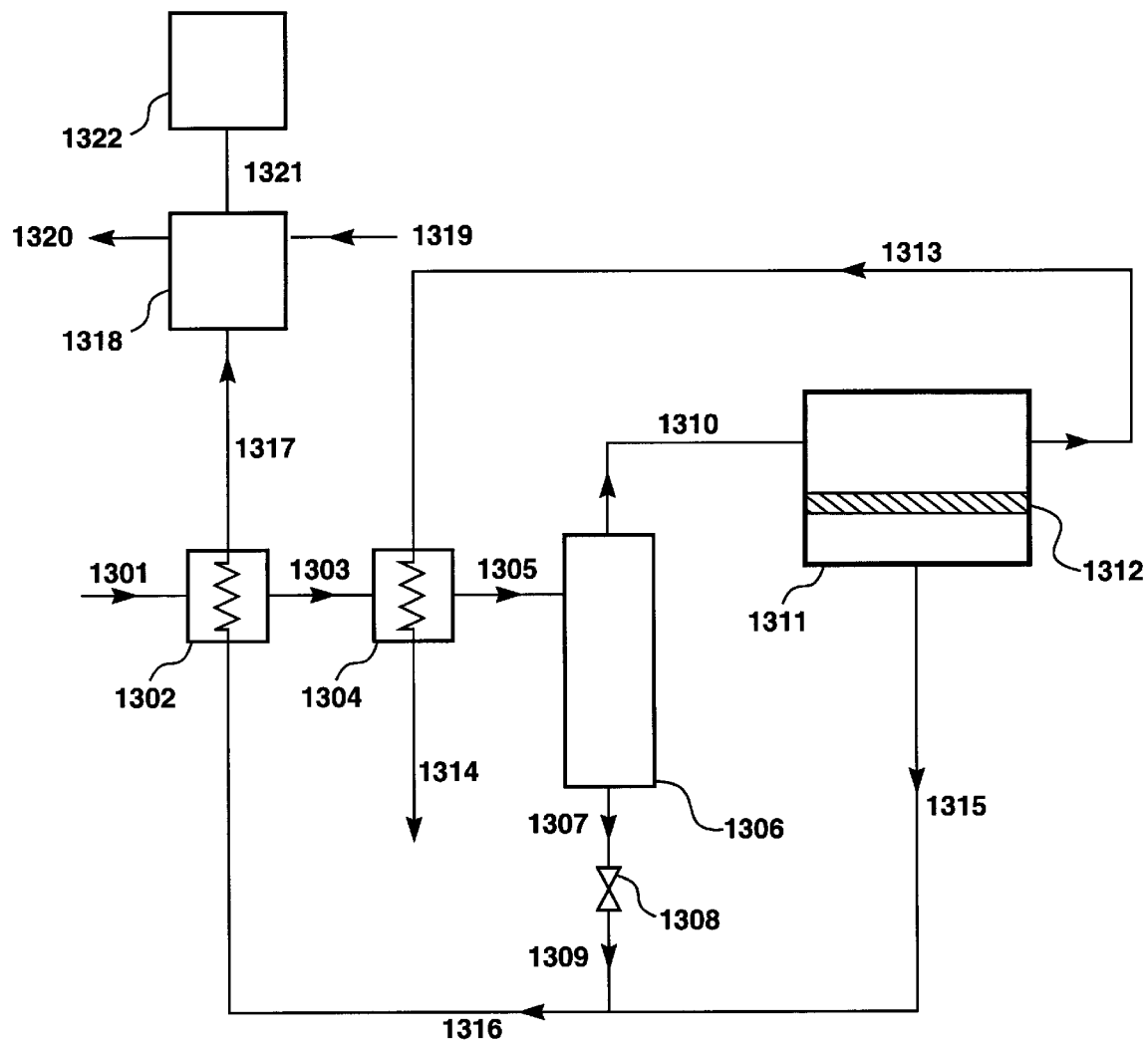
FIG. 13 is a schematic drawing illustrating an embodiment of the invention in which membrane residue and permeate streams are used for heat exchange.

In FIG. 13, the raw feed gas in stream 1301 is run countercurrent to fuel stream, 1316, in heat exchanger, 1302. Cooled stream, 1303, is further chilled by the membrane residue stream, 1313, in heat exchanger 1304. The cold gas stream, 1305, passes to separator, 1306, from which condensed liquid bottoms stream, 1307, is withdrawn. This stream is allowed to vaporize again by lowering the pressure through valve, 1308, and emerges as vapor stream, 1309, which enters the fuel line and is mixed with the permeate stream to form stream 1316.

The cold overhead stream, 1310, from the separator is fed to the membrane unit, 1311, containing a membrane, 1312, that is selective for methane and other hydrocarbons over nitrogen. The membrane feed stream is separated into nitrogen-enriched, methane-depleted residue stream, 1313, and methane-enriched, nitrogen-depleted permeate stream, 1315. The residue stream passes through heat exchanger 1304 to provide cooling for the raw feed stream and is discharged from the process as stream 1314.

The permeate stream, 1315, is mixed with vapor stream 1309 as stream 1316, and, after passage through the coolant channels of heat exchanger 1302, enters the feed line 1317 to the combustor of turbine 1318. Air enters the turbine through inlet 1319 and exhaust gas leaves the turbine as stream 1320. Mechanical power generated by the turbine is transmitted by shaft 1321 to generator 1322.

The raw gas stream was again assumed to be a 5 MMscfd mixture of 30 mol % nitrogen, 53 mol % methane, 10 mol % ethane, 4 mol % propane, 2 mol % butane and 1 mol % pentane at a pressure of 1,000 psia and a temperature of 35° C.

The membrane permeation fluxes were assumed to be as in Example 7. The results of the calculation are shown in Table 3.

TABLE 3

| Stream | 1301 | 1305 | 1307 | 1309 | 1310 | 1313 | 1314 | 1315 | 1316 | 1317 |
|---|---|---|---|---|---|---|---|---|---|---|
| Flow (lbmol/h) | 580 | 580 | 89.8 | 89.8 | 491 | 192 | 192 | 299 | 389 | 389 |
| Mass flow (lb/h) | 13,700 | 13,700 | 3,000 | 3,000 | 10,700 | 4,600 | 4,600 | 6,100 | 9,100 | 9,100 |
| Temp. (° C.) | 35 | −40 | −40 | −74 | −40 | −71 | −38 | −71 | −74 | 30 |
| Pressure (psia) | 1,000 | 1,000 | 1,000 | 65 | 1,000 | 990 | 990 | 65 | 65 | 65 |
| Component (mol %): | | | | | | | | | | |
| Nitrogen | 30.0 | 30.0 | 6.8 | 6.8 | 34.2 | 64.2 | 64.2 | 15.0 | 13.1 | 13.1 |
| Methane | 53.0 | 53.0 | 34.0 | 34.0 | 56.5 | 34.4 | 34.4 | 70.7 | 62.2 | 62.2 |
| Ethane | 10.0 | 10.0 | 24.3 | 24.3 | 7.4 | 1.4 | 1.4 | 11.3 | 14.3 | 14.3 |
| Propane | 4.0 | 4.0 | 17.4 | 17.4 | 1.5 | 0.04 | 0.04 | 2.5 | 6.0 | 6.0 |
| Butanes | 2.0 | 2.0 | 11.3 | 11.3 | 0.3 | — | — | 0.5 | 3.0 | 3.0 |
| Pentanes | 1.0 | 1.0 | 6.2 | 6.2 | 0.05 | — | — | 0.08 | 1.5 | 1.5 |

— less than 0.01
Membrane area = 267 m$^2$

In this case, since no NGL is withdrawn, the fuel gas is a richer mixture than in Example 7 and contains only 13 mol % nitrogen. This provides a higher Btu value of 1,270 Btu/scf and a flow rate of about 3.3 MMscfd. Since no recompression is used, the fuel gas is supplied to the combustor at 65 psia. The waste stream 1314 contains about 36 mol % hydrocarbons and has a flow rate of about 1.7 MMscfd, representing loss of about 7% of the hydrocarbon content of the feed.

I claim:

1. A method for generating electric power, comprising the steps of:
   (a) performing a membrane separation step, comprising:
      (i) providing a membrane having a feed side and a permeate side and being selective for methane over nitrogen;
      (ii) passing a gas stream comprising methane and nitrogen across the feed side of the membrane;
      (iii) withdrawing from the feed side a residue stream depleted in methane and enriched in nitrogen compared with the gas stream;
      (iv) withdrawing from the permeate side a permeate stream enriched in methane and depleted in nitrogen compared with the gas stream;
   (b) using at least a portion of the permeate stream as combustion fuel in a driver;
   (c) using the driver to drive an electric power generator.

2. The method of claim 1, wherein the driver is a gas turbine.

3. The method of claim 1, wherein the driver is an internal combustion engine.

4. The method of claim 1, wherein the gas stream is cooled prior to passing across the feed side.

5. The method of claim 4, wherein the gas stream is cooled to a temperature no lower than about −60° C.

6. The method of claim 1 wherein the membrane comprises silicone rubber.

7. The method of claim 1, wherein the membrane comprises a substituted polyacetylene.

8. The method of claim 1, wherein the membrane comprises a carbon membrane.

9. The method of claim 1, wherein at least a portion of the residue stream is used to cool the gas stream.

10. The method of claim 1, wherein at least a portion of the permeate stream is used to cool the gas stream.

11. The method of claim 1, wherein the gas stream further comprises at least one $C_{3+}$ hydrocarbon and the method further comprises recovering at least a portion of the $C_{3+}$ hydrocarbon as a $C_{3+}$ hydrocarbon enriched product by subjecting the gas stream to condensation before the gas stream passes across the feed side.

12. The method of claim 1, wherein the membrane is maintained at a temperature at which it exhibits a selectivity for methane over nitrogen of at least about 4.

13. The method of claim 1, wherein the membrane is maintained at a temperature at which it exhibits a selectivity for methane over nitrogen of at least about 5.

14. The method of claim 1, further comprising:
   passing the residue stream through a turbo-expander thereby further cooling the residue stream:
   passing the further-cooled residue stream in heat-exchanging relationship against the gas stream prior to passing the gas stream across the feed side; and
   passing the permeate stream to a compressor driven by the turbo-expander thereby compressing the permeate stream prior to passing the permeate stream to the driver.

15. The method of claim 1, further comprising:
   using an exhaust gas stream from the driver to produce steam.

16. The method of claim 15, further comprising:
   passing the produced steam to a steam turbine and using the steam turbine to drive an additional electric power generator.

17. A method for generating electric power, comprising the steps of:
   (a) cooling a gas stream comprising methane, nitrogen and at least one $C_{3+}$ hydrocarbon, thereby condensing at least a portion of the $C_{3+}$ hydrocarbon;
   (b) withdrawing the portion as a $C_{3+}$ hydrocarbon enriched product;

(c) providing a membrane having a feed side and a permeate side and being selective for methane over nitrogen;

(d) passing the uncondensed portion of the gas stream across the feed side of the membrane;

(e) withdrawing from the feed side a residue stream depleted in methane and enriched in nitrogen compared with the uncondensed portion;

(f) withdrawing from the permeate side a permeate stream enriched in methane and depleted in nitrogen compared with the uncondensed portion;

(g) expanding the residue stream in an expander, thereby cooling it, then passing the residue stream in heat-exchanging relationship against the incoming gas stream to provide at least part of the cooling of step (a);

(h) passing the permeate stream through a compressor driven by the expander of step (g), thereby raising the pressure of the permeate stream;

(i) using at least a portion of the permeate stream as combustion fuel in a turbine;

(j) using the turbine to drive an electric power generator.

18. The method of claim 17, further comprising passing the permeate stream in heat-exchanging relationship against the incoming gas stream to provide at least part of the cooling of step (a) before passing the permeate stream through the compressor.

19. Apparatus for generating electric power, comprising:

(a) a membrane separation unit containing a membrane having a feed side and a permeate side and being selective for methane over nitrogen;

(b) a driver having a combustor, the driver being connected in gas-transferring relationship to the membrane separation unit, so that gas can flow out of the membrane separation unit from the permeate side and into the combustor;

(c) an electric power generator adapted to convert mechanical energy into electrical energy and connected in power-transferring relationship to the driver so that the driver can supply power to run the generator.

20. The apparatus of claim 19, wherein the driver is a gas turbine.

21. The apparatus of claim 19, wherein the driver is an internal combustion engine.

22. The apparatus of claim 19, wherein the membrane is a rubbery membrane.

23. The apparatus of claim 19, further comprising:

a gas inlet line connected to the feed side; and a heat exchanger positioned in the gas inlet line so that incoming gas may be cooled as it passes through the heat exchanger.

* * * * *